US012665381B2

(12) United States Patent
Fujimoto et al.

(10) Patent No.: US 12,665,381 B2
(45) Date of Patent: Jun. 23, 2026

(54) LASER APPARATUS, WAVELENGTH CONTROL METHOD, AND ELECTRONIC DEVICE MANUFACTURING METHOD

(71) Applicant: Gigaphoton Inc., Tochigi (JP)

(72) Inventors: Junichi Fujimoto, Oyama (JP);
Takahito Kumazaki, Oyama (JP);
Akiyoshi Suzuki, Oyama (JP)

(73) Assignee: Gigaphoton Inc., Tochigi (JP)

( * ) Notice: Subject to any disclaimer, the term of this patent is extended or adjusted under 35 U.S.C. 154(b) by 768 days.

(21) Appl. No.: 18/149,986

(22) Filed: Jan. 4, 2023

(65) Prior Publication Data

US 2023/0155343 A1 May 18, 2023

Related U.S. Application Data

(63) Continuation of application No. PCT/JP2020/032816, filed on Aug. 31, 2020.

(51) Int. Cl.
*H01S 3/139* (2006.01)
*H01S 3/08* (2023.01)
(Continued)

(52) U.S. Cl.
CPC ............ *H01S 3/139* (2013.01); *H01S 3/0809* (2013.01); *H01S 3/1055* (2013.01); *H01S 3/1305* (2013.01); *H01S 3/097* (2013.01)

(58) Field of Classification Search
CPC .. H01S 3/08086; H01S 3/0809; H01S 3/1055; H01S 3/1305; H01S 3/139
See application file for complete search history.

(56) References Cited

U.S. PATENT DOCUMENTS

| | | | | |
|---|---|---|---|---|
| 5,701,320 A | * | 12/1997 | Sugiyama | H01S 3/139 |
| | | | | 372/19 |
| 6,014,206 A | * | 1/2000 | Basting | H01S 3/139 |
| | | | | 356/138 |

(Continued)

FOREIGN PATENT DOCUMENTS

| | | |
|---|---|---|
| CN | 107112712 A | 8/2017 |
| CN | 108475896 A | 8/2018 |

(Continued)

OTHER PUBLICATIONS

Search Report mailed by China National Intellectual Property Administration on Jan. 21, 2025, which corresponds to Chinese Patent Application No. 202080102494.8 and is related to U.S. Appl. No. 18/149,986.

(Continued)

*Primary Examiner* — James A Menefee
(74) *Attorney, Agent, or Firm* — Studebaker Brackett PLLC

(57) ABSTRACT

A laser apparatus includes a first optical element, a second optical element, a first actuator configured to change a first wavelength component included in a pulse laser beam by changing a posture of the first optical element, a second actuator configured to change a second wavelength component included in the pulse laser beam by changing a posture of the second optical element, a first encoder configured to measure a position of the first actuator, a second encoder configured to measure a position of the second actuator, and a processor. The processor reads a first relation and a second relation and performs control of the first actuator based on the first relation and the position of the first actuator measured by the first encoder and control of the second actuator based on the second relation and the position of the second actuator measured by the second encoder.

16 Claims, 24 Drawing Sheets

(51) Int. Cl.
_H01S 3/1055_ (2006.01)
_H01S 3/13_ (2006.01)
_H01S 3/097_ (2006.01)

(56) References Cited

U.S. PATENT DOCUMENTS

| | | | |
|---|---|---|---|
| 6,335,943 B1 | 1/2002 | Lorraine et al. | |
| 6,526,086 B1 * | 2/2003 | Wakabayashi | H01S 3/106 |
| | | | 372/100 |
| 2003/0007522 A1 | 1/2003 | Li et al. | |
| 2004/0190577 A1 | 9/2004 | Albrecht et al. | |
| 2005/0135439 A1 * | 6/2005 | Chapman | H01S 5/141 |
| | | | 372/20 |
| 2005/0286598 A1 * | 12/2005 | Sandstrom | G03F 7/70575 |
| | | | 372/55 |
| 2006/0114958 A1 * | 6/2006 | Trintchouk | B82Y 10/00 |
| | | | 372/55 |
| 2008/0181262 A1 * | 7/2008 | Wakabayashi | G03F 7/2006 |
| | | | 372/9 |
| 2008/0285602 A1 | 11/2008 | Nagai et al. | |
| 2011/0116522 A1 | 5/2011 | Riggs et al. | |
| 2013/0215916 A1 | 8/2013 | Kakizaki et al. | |
| 2013/0315270 A1 | 11/2013 | Kumazaki et al. | |
| 2016/0285222 A1 * | 9/2016 | Suganuma | H01S 3/2232 |
| 2016/0316551 A1 * | 10/2016 | Kurosawa | H05G 2/0086 |
| 2017/0222391 A1 | 8/2017 | Moriya et al. | |
| 2018/0109069 A1 * | 4/2018 | Phillips | H01S 5/0683 |
| 2018/0323568 A1 | 11/2018 | Furusato et al. | |
| 2020/0119514 A1 * | 4/2020 | Ando | G03F 7/70033 |
| 2020/0203912 A1 | 6/2020 | Litmanovic et al. | |

FOREIGN PATENT DOCUMENTS

| | | | | |
|---|---|---|---|---|
| CN | 110622372 A | 12/2019 | | |
| DE | 4015861 A1 * | 11/1991 | | H01S 3/086 |
| JE | 2003-008122 A | 1/2003 | | |
| JE | 2006-269628 A | 10/2006 | | |
| JP | 2005-507156 A | 3/2005 | | |
| JP | 2007-005538 A | 1/2007 | | |
| JP | 2013-062484 A | 4/2013 | | |
| JP | 2013-247240 A | 12/2013 | | |
| WO | 2006006499 A1 | 1/2006 | | |

OTHER PUBLICATIONS

An Office Action; mailed by the China National Intellectual Property Administration of the People's Republic of China on Sep. 25, 2024, which corresponds to Chinese Patent Application No. 202080102494.8 and is related to U.S. Appl. No. 18/149,986.

International Search Report issued in PCT/JP2020/032816; mailed Nov. 17, 2020.

International Preliminary Report On Patentability and Written Opinion issued in PCT/JP2020/032816; issued Feb. 28, 2023.

* cited by examiner

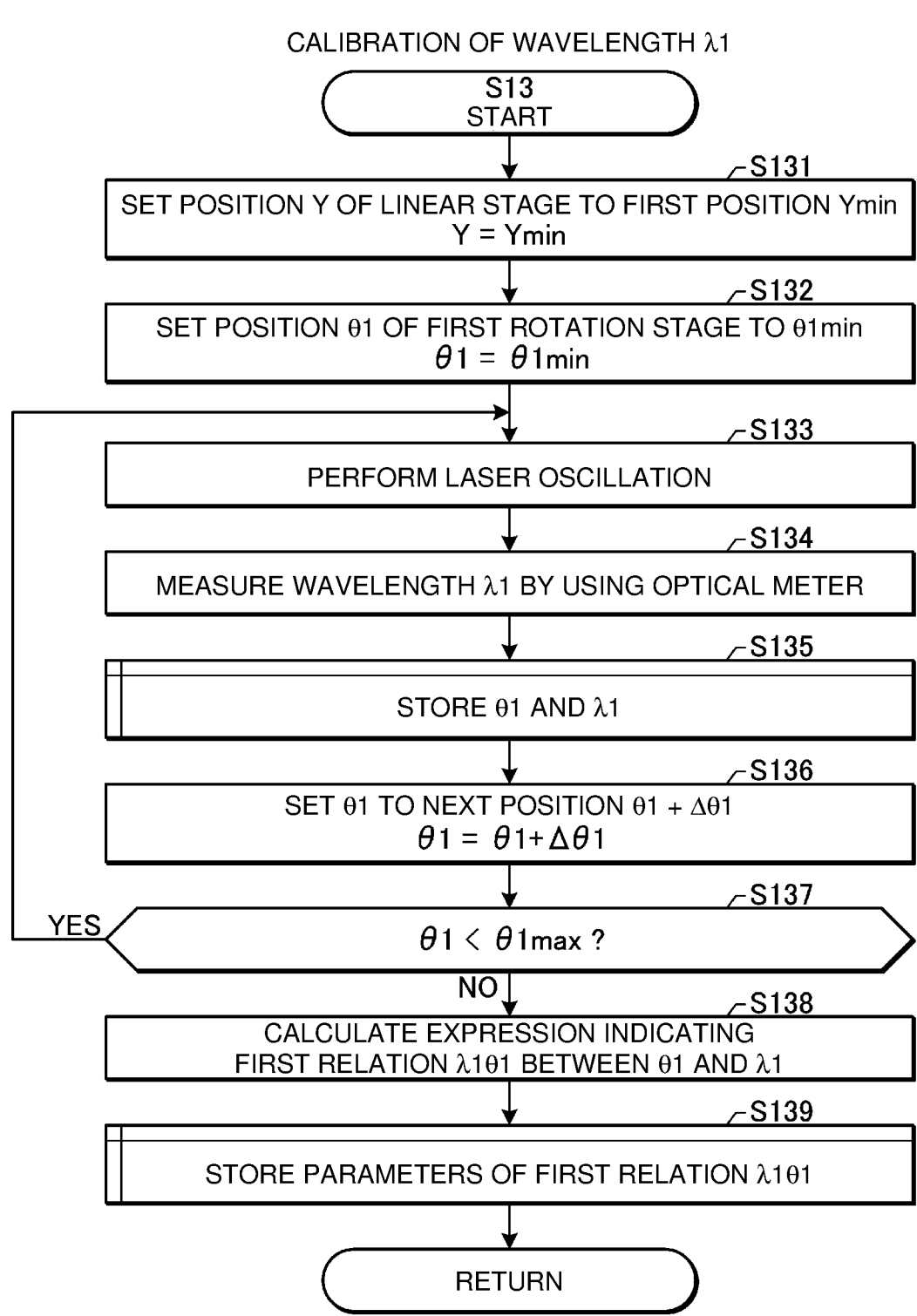

CALIBRATION OF WAVELENGTH λ1

S13
START

S131
SET POSITION Y OF LINEAR STAGE TO FIRST POSITION Ymin
Y = Ymin

S132
SET POSITION θ1 OF FIRST ROTATION STAGE TO θ1min
$\theta 1 = \theta 1min$

S133
PERFORM LASER OSCILLATION

S134
MEASURE WAVELENGTH λ1 BY USING OPTICAL METER

S135
STORE θ1 AND λ1

S136
SET θ1 TO NEXT POSITION θ1 + Δθ1
$\theta 1 = \theta 1 + \Delta \theta 1$

S137
YES    $\theta 1 < \theta 1max$ ?

NO

S138
CALCULATE EXPRESSION INDICATING
FIRST RELATION λ1θ1 BETWEEN θ1 AND λ1

S139
STORE PARAMETERS OF FIRST RELATION λ1θ1

RETURN

Fig. 17

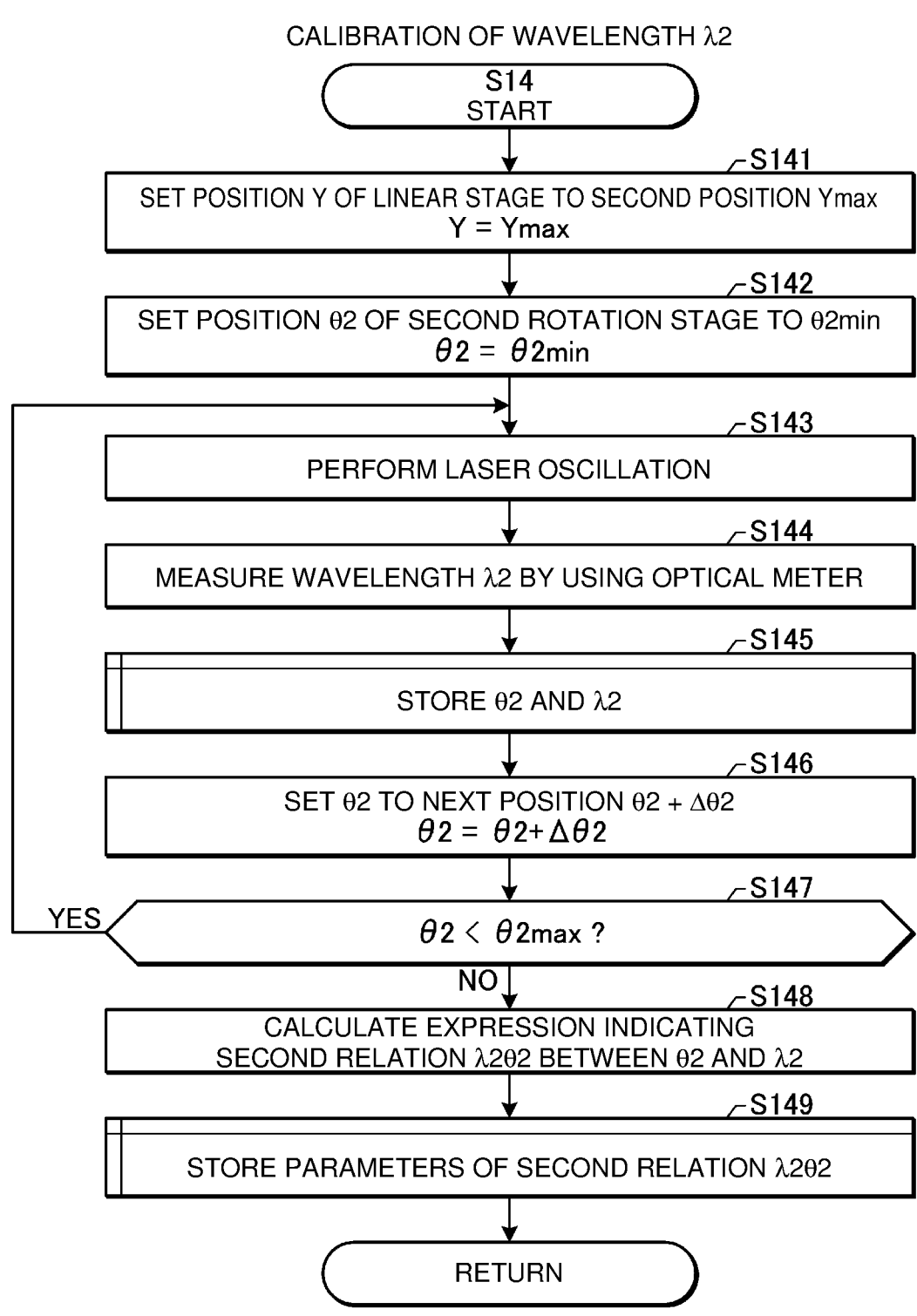

CALIBRATION OF WAVELENGTH λ2

S14
START

SET POSITION Y OF LINEAR STAGE TO SECOND POSITION Ymax
Y = Ymax
— S141

SET POSITION θ2 OF SECOND ROTATION STAGE TO θ2min
θ2 = θ2min
— S142

PERFORM LASER OSCILLATION
— S143

MEASURE WAVELENGTH λ2 BY USING OPTICAL METER
— S144

STORE θ2 AND λ2
— S145

SET θ2 TO NEXT POSITION θ2 + Δθ2
θ2 = θ2+Δθ2
— S146

θ2 < θ2max ?
— S147

YES

NO

CALCULATE EXPRESSION INDICATING
SECOND RELATION λ2θ2 BETWEEN θ2 AND λ2
— S148

STORE PARAMETERS OF SECOND RELATION λ2θ2
— S149

RETURN

Fig. 18

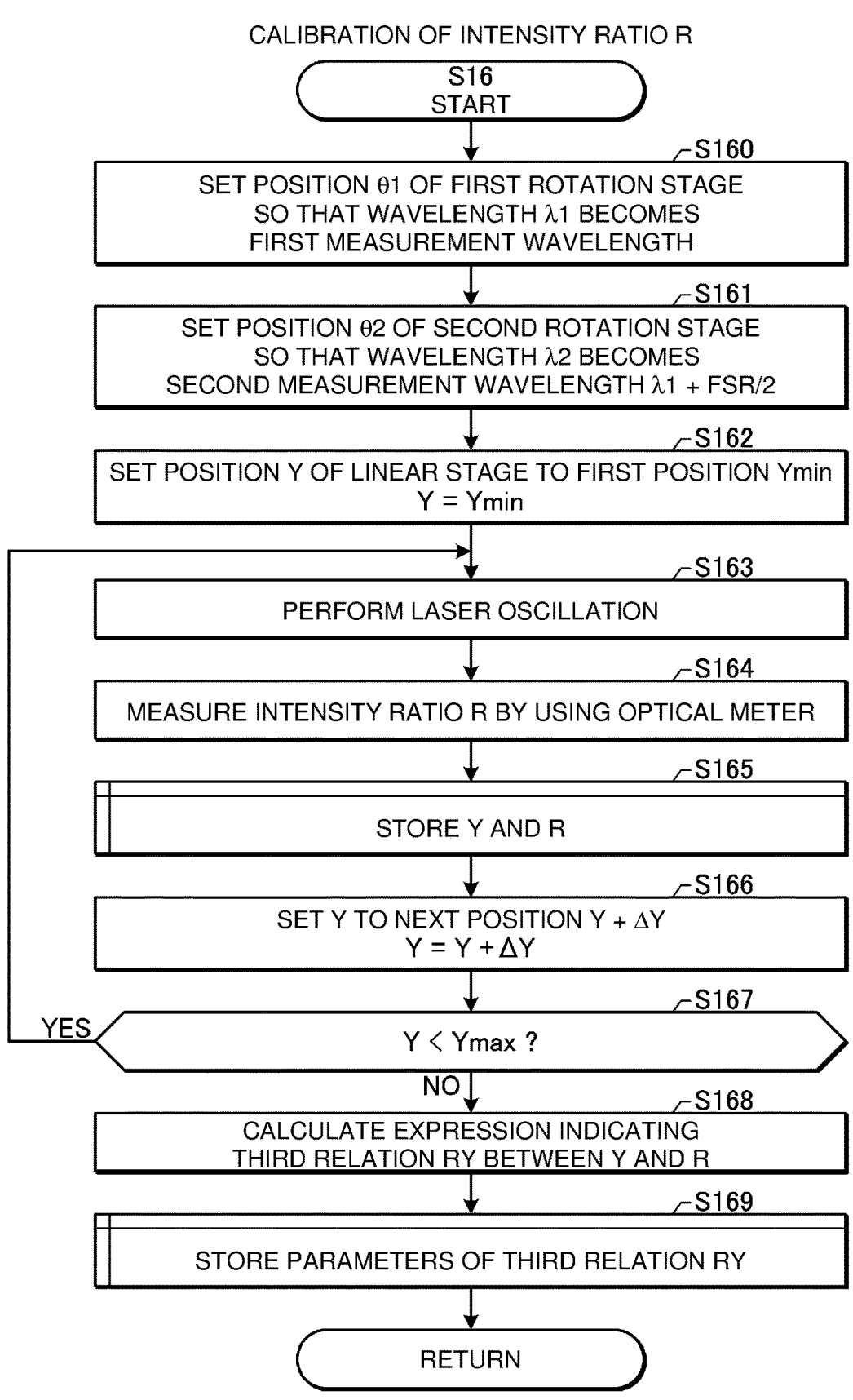

CALIBRATION OF INTENSITY RATIO R

S16
START

*S160*
SET POSITION θ1 OF FIRST ROTATION STAGE
SO THAT WAVELENGTH λ1 BECOMES
FIRST MEASUREMENT WAVELENGTH

*S161*
SET POSITION θ2 OF SECOND ROTATION STAGE
SO THAT WAVELENGTH λ2 BECOMES
SECOND MEASUREMENT WAVELENGTH λ1 + FSR/2

*S162*
SET POSITION Y OF LINEAR STAGE TO FIRST POSITION Ymin
Y = Ymin

*S163*
PERFORM LASER OSCILLATION

*S164*
MEASURE INTENSITY RATIO R BY USING OPTICAL METER

*S165*
STORE Y AND R

*S166*
SET Y TO NEXT POSITION Y + ΔY
Y = Y + ΔY

*S167*
YES   Y < Ymax ?

NO

*S168*
CALCULATE EXPRESSION INDICATING
THIRD RELATION RY BETWEEN Y AND R

*S169*
STORE PARAMETERS OF THIRD RELATION RY

RETURN

Fig. 25

EXPOSURE LIGHT OUTPUTTING

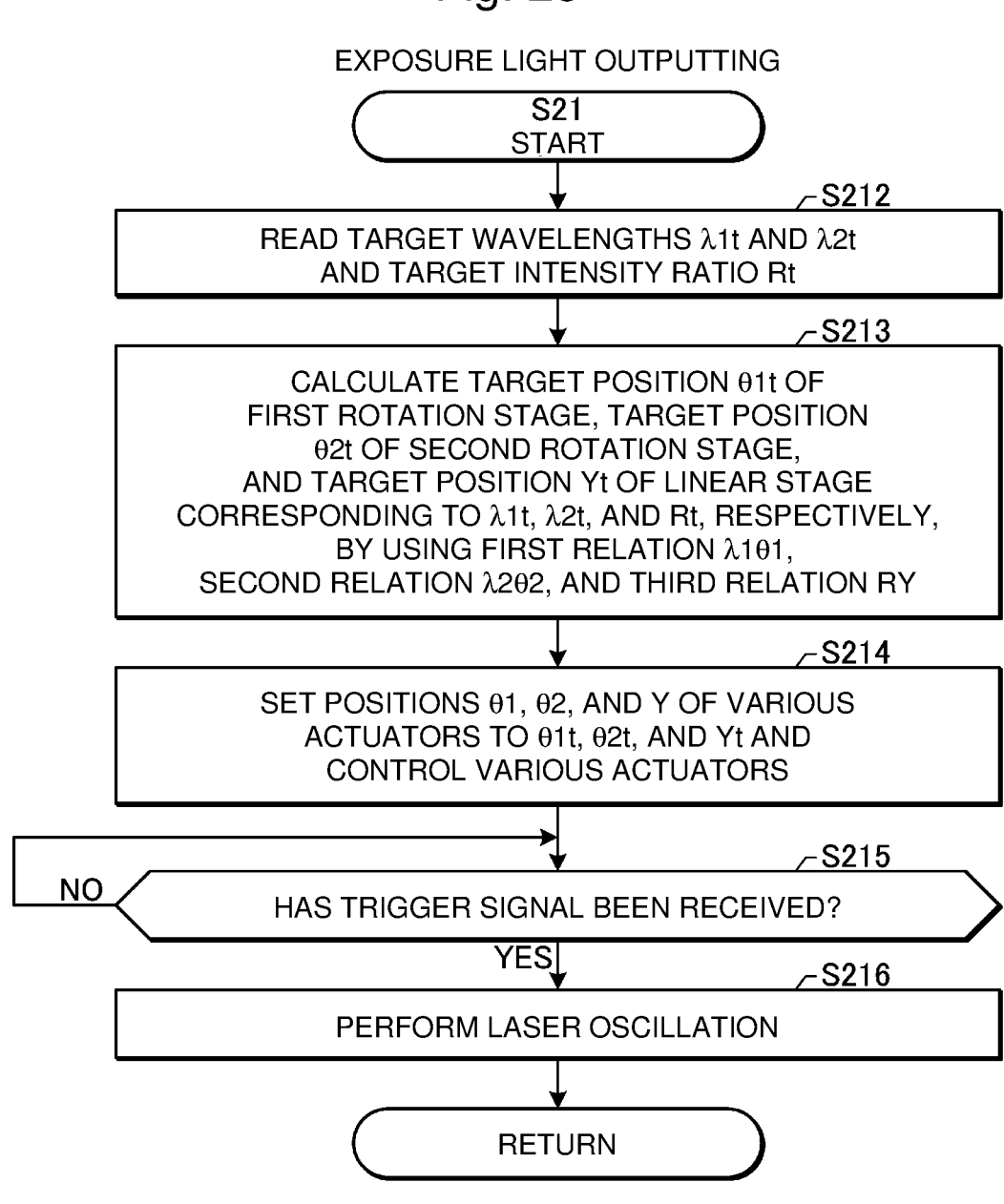

S21
START

S212
READ TARGET WAVELENGTHS $\lambda 1t$ AND $\lambda 2t$
AND TARGET INTENSITY RATIO Rt S213
CALCULATE TARGET POSITION $\theta 1t$ OF
FIRST ROTATION STAGE, TARGET POSITION
$\theta 2t$ OF SECOND ROTATION STAGE,
AND TARGET POSITION Yt OF LINEAR STAGE
CORRESPONDING TO $\lambda 1t$, $\lambda 2t$, AND Rt, RESPECTIVELY,
BY USING FIRST RELATION $\lambda 1 \theta 1$,
SECOND RELATION $\lambda 2 \theta 2$, AND THIRD RELATION RY S214
SET POSITIONS $\theta 1$, $\theta 2$, AND Y OF VARIOUS
ACTUATORS TO $\theta 1t$, $\theta 2t$, AND Yt AND
CONTROL VARIOUS ACTUATORS

S215
HAS TRIGGER SIGNAL BEEN RECEIVED?    NO

YES

S216
PERFORM LASER OSCILLATION

RETURN

Fig. 26

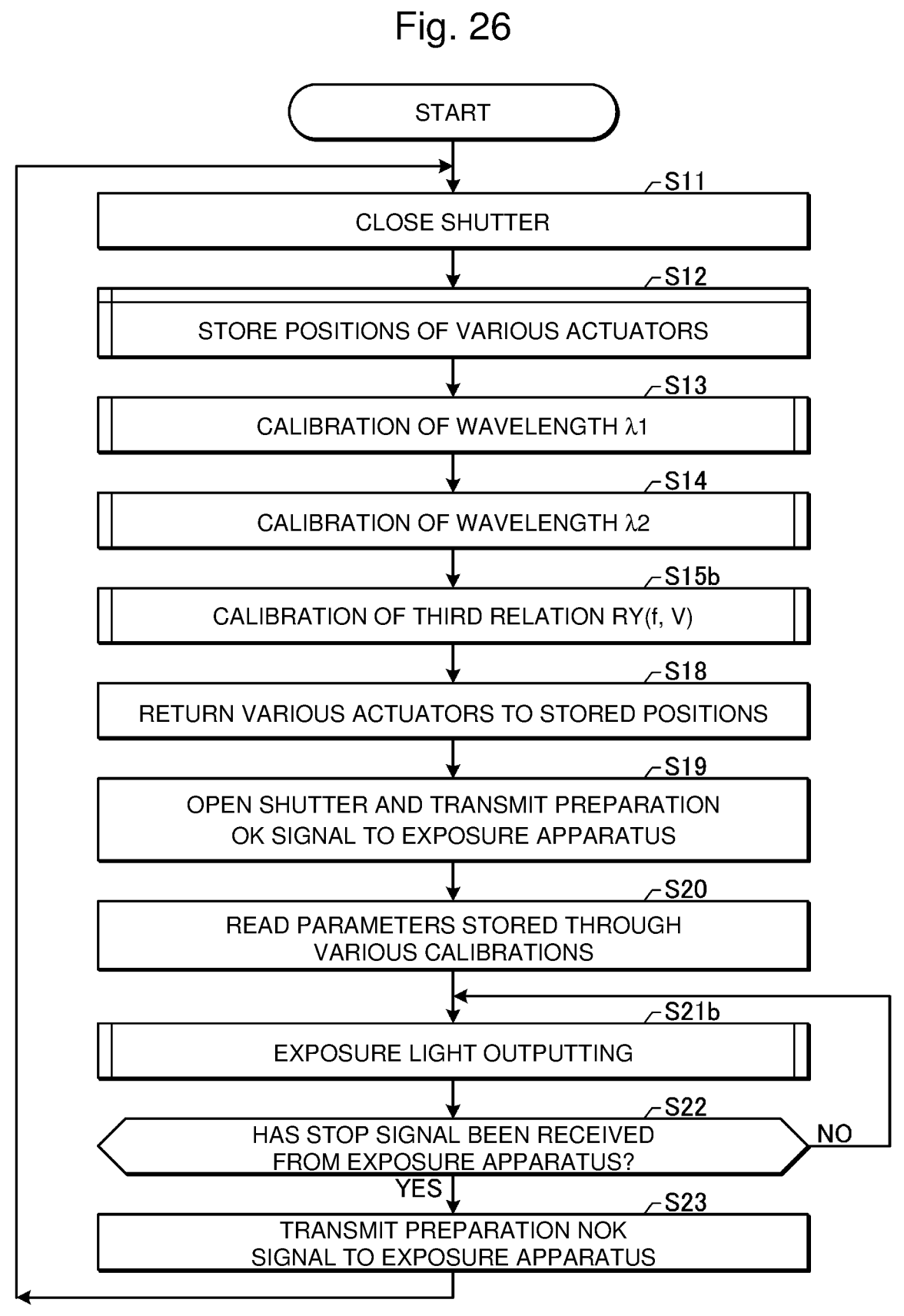

```
                        ( START )
                            │
                            ▼              ┌─S11
        ┌──────────────────────────────────────────┐
        │              CLOSE SHUTTER               │
        └──────────────────────────────────────────┘
                            │              ┌─S12
        ┌──────────────────────────────────────────┐
        │     STORE POSITIONS OF VARIOUS ACTUATORS  │
        └──────────────────────────────────────────┘
                            │              ┌─S13
        ┌──────────────────────────────────────────┐
        │      CALIBRATION OF WAVELENGTH λ1         │
        └──────────────────────────────────────────┘
                            │              ┌─S14
        ┌──────────────────────────────────────────┐
        │      CALIBRATION OF WAVELENGTH λ2         │
        └──────────────────────────────────────────┘
                            │              ┌─S15b
        ┌──────────────────────────────────────────┐
        │   CALIBRATION OF THIRD RELATION RY(f, V)  │
        └──────────────────────────────────────────┘
                            │              ┌─S18
        ┌──────────────────────────────────────────┐
        │  RETURN VARIOUS ACTUATORS TO STORED POSITIONS │
        └──────────────────────────────────────────┘
                            │              ┌─S19
        ┌──────────────────────────────────────────┐
        │  OPEN SHUTTER AND TRANSMIT PREPARATION    │
        │  OK SIGNAL TO EXPOSURE APPARATUS          │
        └──────────────────────────────────────────┘
                            │              ┌─S20
        ┌──────────────────────────────────────────┐
        │    READ PARAMETERS STORED THROUGH         │
        │      VARIOUS CALIBRATIONS                 │
        └──────────────────────────────────────────┘
                            │              ┌─S21b
        ┌──────────────────────────────────────────┐
        │      EXPOSURE LIGHT OUTPUTTING            │
        └──────────────────────────────────────────┘
                            │              ┌─S22
        <  HAS STOP SIGNAL BEEN RECEIVED            >── NO
        <  FROM EXPOSURE APPARATUS?                 >
                         YES │              ┌─S23
        ┌──────────────────────────────────────────┐
        │    TRANSMIT PREPARATION NOK               │
        │  SIGNAL TO EXPOSURE APPARATUS             │
        └──────────────────────────────────────────┘
```

CALIBRATION OF THIRD RELATION RY(f, V)

THIRD RELATION RY(f, V) TABLE

| REPETITION FREQUENCY f | CHARGING VOLTAGE V | | | | |
|---|---|---|---|---|---|
| | V1 − V2 | V2 − V3 | V3 − V4 | V4 − V5 | V5 − V6 |
| f1 − f2 | RY (f1, V1) | RY (f1, V2) | RY (f1, V3) | RY (f1, V4) | RY (f1, V5) |
| f2 − f3 | RY (f2, V1) | RY (f2, V2) | RY (f2, V3) | RY (f2, V4) | RY (f2, V5) |
| f3 − f4 | RY (f3, V1) | RY (f3, V2) | RY (f3, V3) | RY (f3, V4) | RY (f3, V5) |
| f4 − f5 | RY (f4, V1) | RY (f4, V2) | RY (f4, V3) | RY (f4, V4) | RY (f4, V5) |
| f5 − f6 | RY (f5, V1) | RY (f5, V2) | RY (f5, V3) | RY (f5, V4) | RY (f5, V5) |

Fig. 29

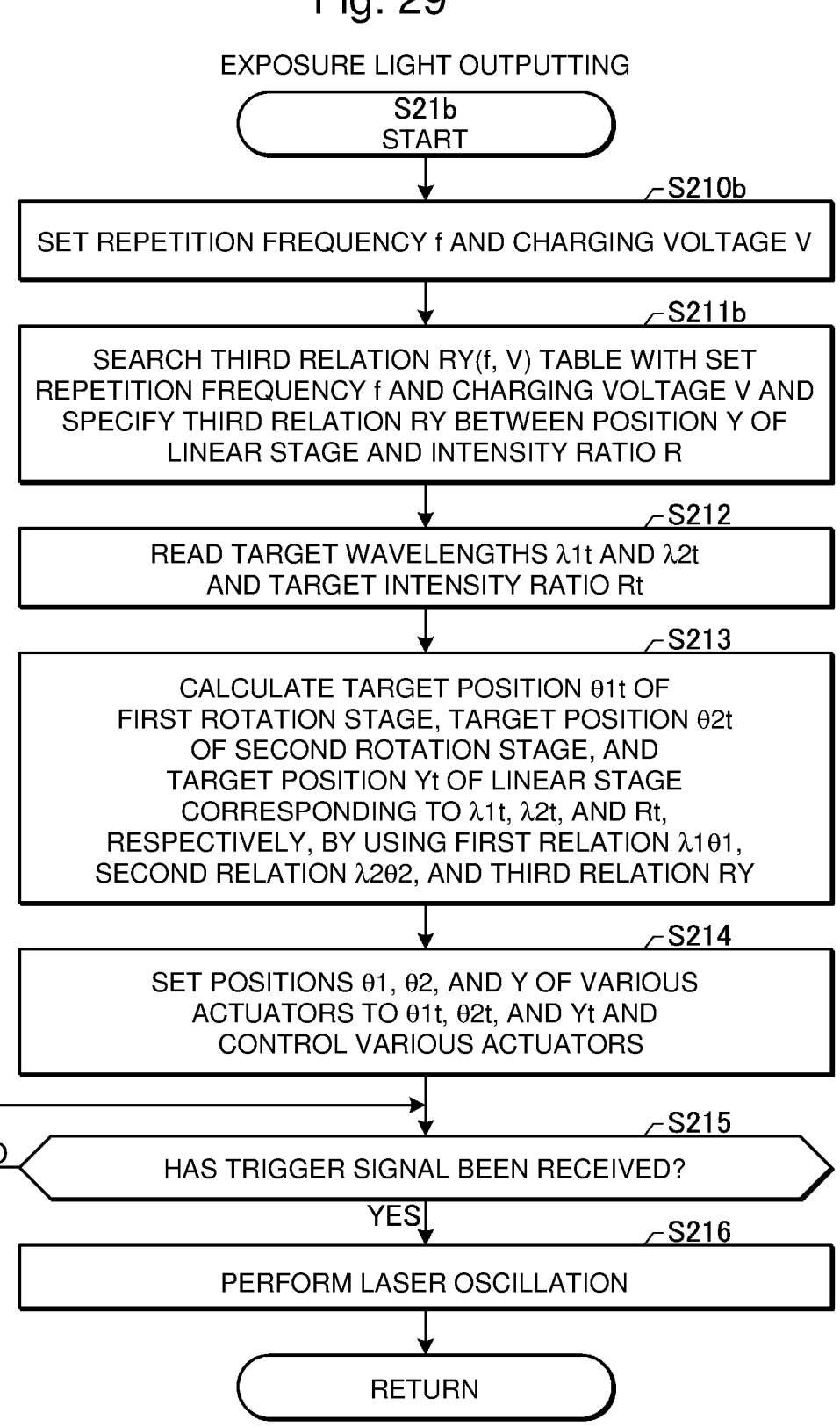

EXPOSURE LIGHT OUTPUTTING

S21b
START

S210b

SET REPETITION FREQUENCY f AND CHARGING VOLTAGE V

S211b

SEARCH THIRD RELATION RY(f, V) TABLE WITH SET
REPETITION FREQUENCY f AND CHARGING VOLTAGE V AND
SPECIFY THIRD RELATION RY BETWEEN POSITION Y OF
LINEAR STAGE AND INTENSITY RATIO R

S212

READ TARGET WAVELENGTHS λ1t AND λ2t
AND TARGET INTENSITY RATIO Rt

S213

CALCULATE TARGET POSITION θ1t OF
FIRST ROTATION STAGE, TARGET POSITION θ2t
OF SECOND ROTATION STAGE, AND
TARGET POSITION Yt OF LINEAR STAGE
CORRESPONDING TO λ1t, λ2t, AND Rt,
RESPECTIVELY, BY USING FIRST RELATION λ1θ1,
SECOND RELATION λ2θ2, AND THIRD RELATION RY

S214

SET POSITIONS θ1, θ2, AND Y OF VARIOUS
ACTUATORS TO θ1t, θ2t, AND Yt AND
CONTROL VARIOUS ACTUATORS

S215

NO ◁ HAS TRIGGER SIGNAL BEEN RECEIVED?

YES

S216

PERFORM LASER OSCILLATION

RETURN

Fig. 30

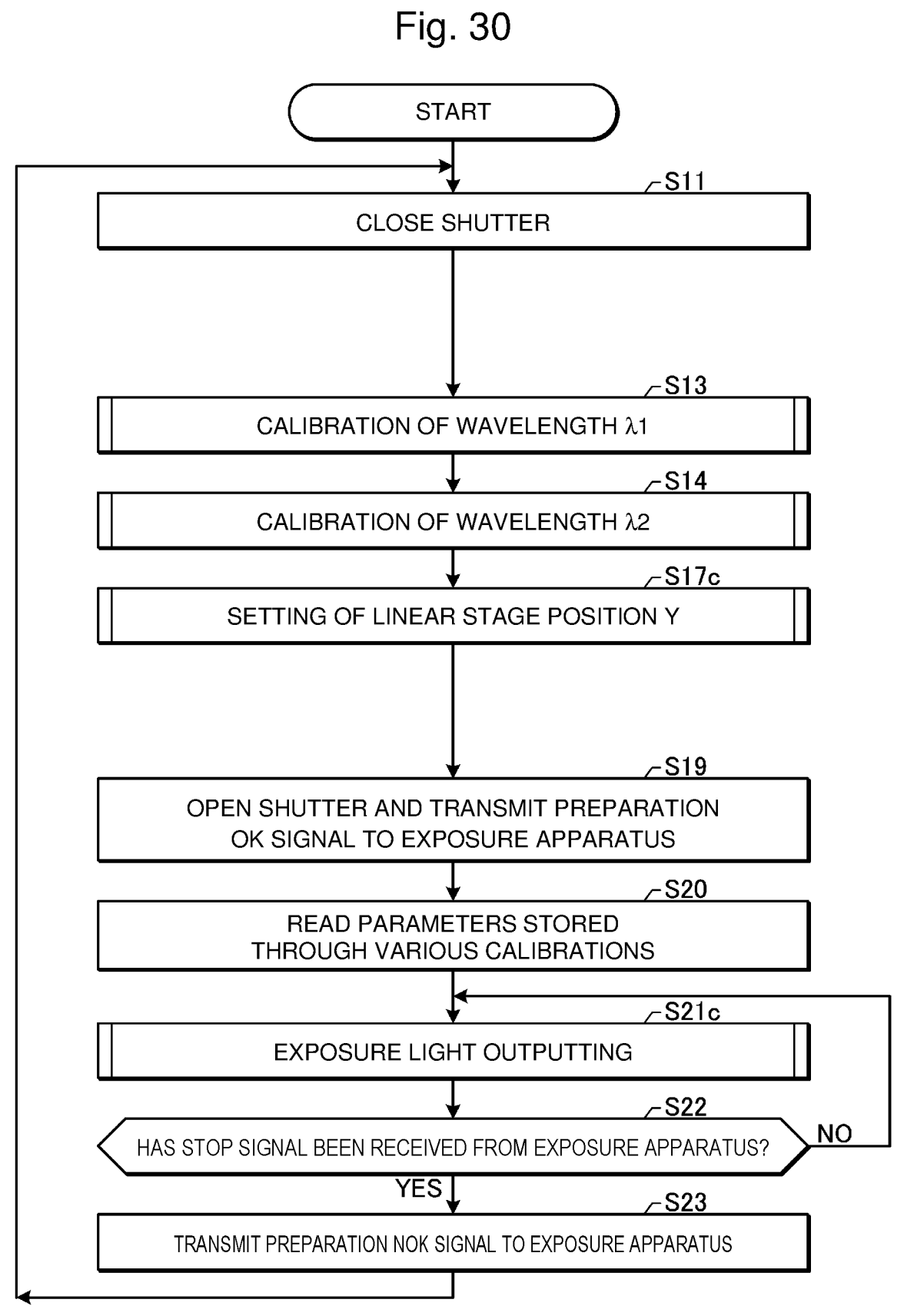

START

S11

CLOSE SHUTTER

S13

CALIBRATION OF WAVELENGTH λ1

S14

CALIBRATION OF WAVELENGTH λ2

S17c

SETTING OF LINEAR STAGE POSITION Y

S19

OPEN SHUTTER AND TRANSMIT PREPARATION OK SIGNAL TO EXPOSURE APPARATUS

S20

READ PARAMETERS STORED THROUGH VARIOUS CALIBRATIONS

S21c

EXPOSURE LIGHT OUTPUTTING

S22

HAS STOP SIGNAL BEEN RECEIVED FROM EXPOSURE APPARATUS? — NO

YES

S23

TRANSMIT PREPARATION NOK SIGNAL TO EXPOSURE APPARATUS

SETTING OF LINEAR STAGE POSITION Y

Fig. 32

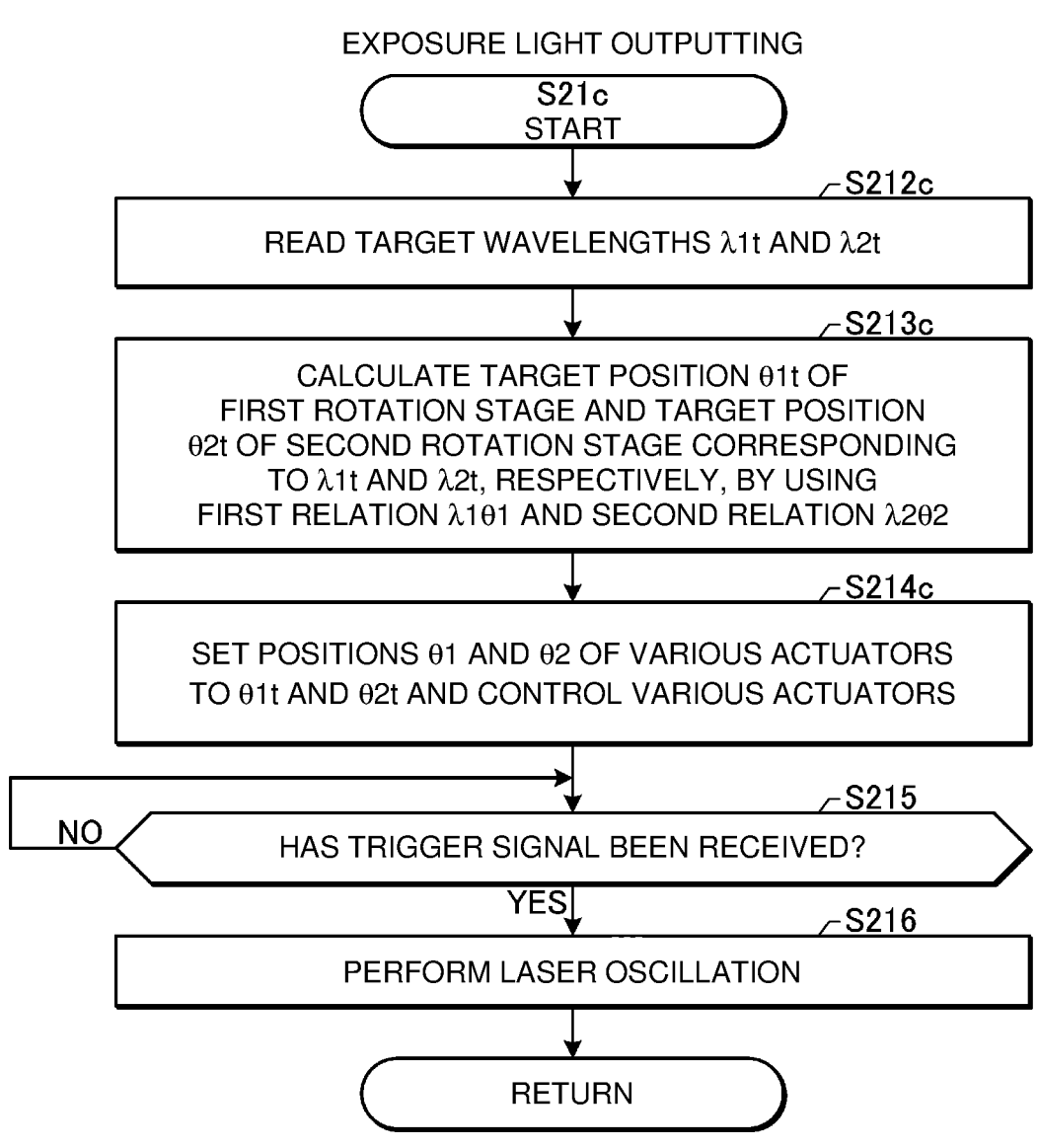

EXPOSURE LIGHT OUTPUTTING

S21c
START

S212c

READ TARGET WAVELENGTHS $\lambda 1t$ AND $\lambda 2t$

S213c

CALCULATE TARGET POSITION $\theta 1t$ OF
FIRST ROTATION STAGE AND TARGET POSITION
$\theta 2t$ OF SECOND ROTATION STAGE CORRESPONDING
TO $\lambda 1t$ AND $\lambda 2t$, RESPECTIVELY, BY USING
FIRST RELATION $\lambda 1\theta 1$ AND SECOND RELATION $\lambda 2\theta 2$ S214c SET POSITIONS $\theta 1$ AND $\theta 2$ OF VARIOUS ACTUATORS
TO $\theta 1t$ AND $\theta 2t$ AND CONTROL VARIOUS ACTUATORS

S215

NO   HAS TRIGGER SIGNAL BEEN RECEIVED?

YES

S216

PERFORM LASER OSCILLATION

RETURN

LASER APPARATUS, WAVELENGTH CONTROL METHOD, AND ELECTRONIC DEVICE MANUFACTURING METHOD

CROSS-REFERENCE TO RELATED APPLICATIONS

The present application is a continuation application of International Application No. PCT/JP2020/032816, filed on Aug. 31, 2020, the entire contents of which are hereby incorporated by reference.

BACKGROUND

1. Technical Field

The present disclosure relates to a laser apparatus, a wavelength control method, and an electronic device manufacturing method.

2. Related Art

Recently, in a semiconductor exposure apparatus, resolving power improvement has been requested along with miniaturization and high integration of a semiconductor integrated circuit. Hereinafter, the semiconductor exposure apparatus is simply referred to as an "exposure apparatus". Thus, the wavelength of light output from an exposure light source has been shortened. Examples of a gas laser apparatus for exposure include a KrF excimer laser apparatus configured to output a laser beam having a wavelength of 248 nm approximately and an ArF excimer laser apparatus configured to output a laser beam having a wavelength of 193 nm approximately.

The KrF excimer laser apparatus and the ArF excimer laser apparatus have a wide spectrum line width of 350 pm to 400 pm for spontaneous oscillation light. Thus, chromatic aberration is caused by a projection lens of the exposure apparatus in some cases. As a result, resolving power potentially decreases. Thus, the spectrum line width of a laser beam output from the gas laser apparatus needs to be narrowed until chromatic aberration becomes negligible. To narrow the spectrum line width, a line narrowing module including a line narrowing element is provided in a laser resonator of the gas laser apparatus in some cases. The line narrowing element includes, for example, an etalon or a grating. Such a gas laser apparatus that achieves narrowing of the spectrum line width is referred to as a line narrowed gas laser apparatus.

LIST OF DOCUMENTS

Patent Documents

Patent Document 1: US Patent Application Publication No. 2011/0116522
Patent Document 2: Japanese Unexamined Patent Application Publication No. 2006-269628

SUMMARY

A laser apparatus according to an aspect of the present disclosure includes a first optical element and a second optical element, a first actuator configured to change a first wavelength component included in a pulse laser beam by changing a posture of the first optical element, a second actuator configured to change a second wavelength component included in the pulse laser beam by changing a posture of the second optical element, a first encoder configured to measure a position of the first actuator, a second encoder configured to measure a position of the second actuator, and a processor. The processor reads a first relation between the position of the first actuator and the first wavelength component and a second relation between the position of the second actuator and the second wavelength component and performs control of the first actuator based on the first relation and the position of the first actuator measured by the first encoder and control of the second actuator based on the second relation and the position of the second actuator measured by the second encoder.

A wavelength control method according to an aspect of the present disclosure is a wavelength control method for a laser apparatus including a first optical element and a second optical element, a first actuator configured to change a first wavelength component included in a pulse laser beam by changing a posture of the first optical element, a second actuator configured to change a second wavelength component included in the pulse laser beam by changing a posture of the second optical element, a first encoder configured to measure a position of the first actuator, a second encoder configured to measure a position of the second actuator, and a processor. The processor reads a first relation between the position of the first actuator and the first wavelength component and a second relation between the position of the second actuator and the second wavelength component and performs control of the first actuator based on the first relation and the position of the first actuator measured by the first encoder and control of the second actuator based on the second relation and the position of the second actuator measured by the second encoder.

An electronic device manufacturing method according to an aspect of the present disclosure includes generating a pulse laser beam with a laser apparatus, the laser apparatus including a first optical element and a second optical element, a first actuator configured to change a first wavelength component included in the pulse laser beam by changing a posture of the first optical element, a second actuator configured to change a second wavelength component included in the pulse laser beam by changing a posture of the second optical element, a first encoder configured to measure a position of the first actuator, a second encoder configured to measure a position of the second actuator, and a processor configured to read a first relation between the position of the first actuator and the first wavelength component and a second relation between the position of the second actuator and the second wavelength component and perform control of the first actuator based on the first relation and the position of the first actuator measured by the first encoder and control of the second actuator based on the second relation and the position of the second actuator measured by the second encoder, outputting the pulse laser beam to an exposure apparatus, and exposing a photosensitive substrate to the pulse laser beam in the exposure apparatus to manufacture an electronic device.

BRIEF DESCRIPTION OF THE DRAWINGS

Embodiments of the present disclosure will be described below as examples with reference to the accompanying drawings.

FIG. 2 schematically illustrates the configuration of the exposure system in the comparative example.

FIG. 16 is a flowchart illustrating calibration processing of the wavelength λ1 in the first embodiment.

FIG. 17 is a flowchart illustrating calibration processing of the wavelength λ2 in the first embodiment.

FIG. 18 is a flowchart illustrating calibration processing of an intensity ratio R in the first embodiment.

FIG. 25 is a flowchart illustrating outputting processing of exposure light in the first embodiment.

FIG. 26 is a flowchart illustrating operation of a laser control processor in a second embodiment.

FIG. 29 is a flowchart illustrating outputting processing of exposure light in the second embodiment.

FIG. 30 is a flowchart illustrating operation of a laser control processor in a third embodiment.

FIG. 32 is a flowchart illustrating outputting processing of exposure light in the third embodiment.

DESCRIPTION OF EMBODIMENTS

Contents

Figure 1:
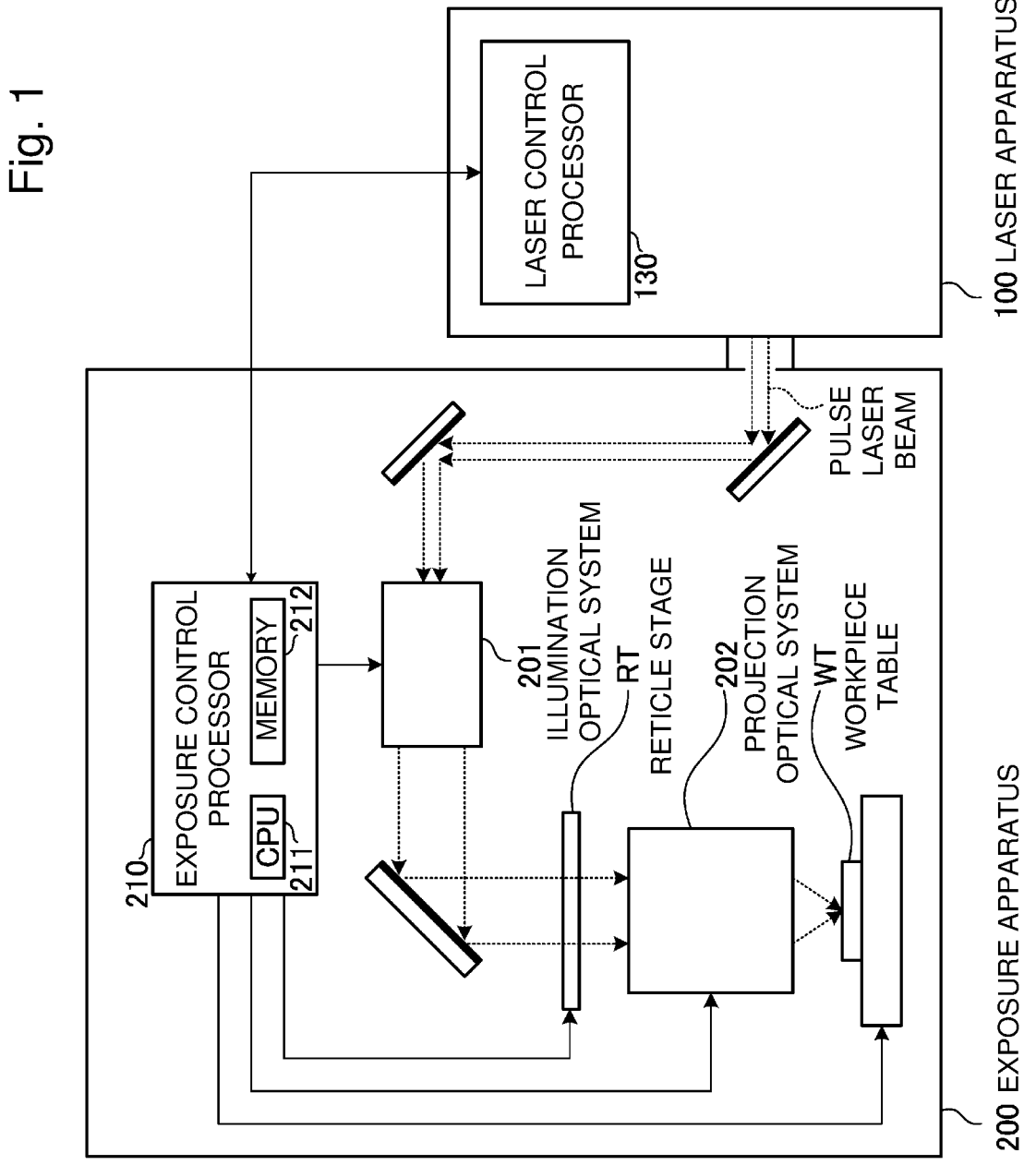
FIG. 1 schematically illustrates the configuration of an exposure system in a comparative example.

1. Comparative example
   1.1 Exposure system
   1.2 Exposure apparatus 200
      1.2.1 Configuration
      1.2.2 Operation
   1.3 Laser apparatus 100
      1.3.1 Configuration
      1.3.2 Operation
   1.4 Line narrowing device 14
      1.4.1 Configuration
         1.4.1.1 Prisms 41 and 42
         1.4.1.2 Grating system 50
      1.4.2 Operation
   1.5 Optical meter 17
      1.5.1 Configuration
      1.5.2 Operation
   1.6 Problem with comparative example
2. Laser apparatus configured to adjust wavelength by controlling rotation stage based on encoder output
   2.1 Configuration
   2.2 Operation
   2.3 Example of encoder
   2.4 Example of intensity ratio R
   2.5 Operation of laser control processor 130
      2.5.1 Main flow
      2.5.2 Wavelength λ1 calibration
      2.5.3 Wavelength λ2 calibration
      2.5.4 Intensity ratio R calibration
      2.5.5 Exposure light outputting 2.6 Effect 3. Laser apparatus configured to select third relation RY in accordance with repetition frequency f and charging voltage V 3.1 Main flow 3.2 Third relation RY(f, V) calibration 3.3 Exposure light outputting 3.4 Effect 3.5 Other exemplary configuration 4. Laser apparatus configured to adjust intensity ratio R without using third relation RY 4.1 Main flow 4.2 Setting of position Y of linear stage 612

4.3 Exposure light outputting 4.4 Effect

5. Line narrowing device 14d in which a plurality of prisms 43 and 44 are disposed in XZ plane 5.1 Configuration 5.2 Operation 5.3 First modification 5.4 Second modification 6. Other Embodiments of the present disclosure will be described below in detail with reference to the accompanying drawings. The embodiments described below are examples of the present disclosure, and do not limit the contents of the present disclosure. Not all configurations and operations described in each embodiment are necessarily essential as configurations and operations of the present disclosure. Components identical to each other are denoted by an identical reference sign, and duplicate description thereof will be omitted.

1. COMPARATIVE EXAMPLE

1.1 Exposure System

Figure 2:
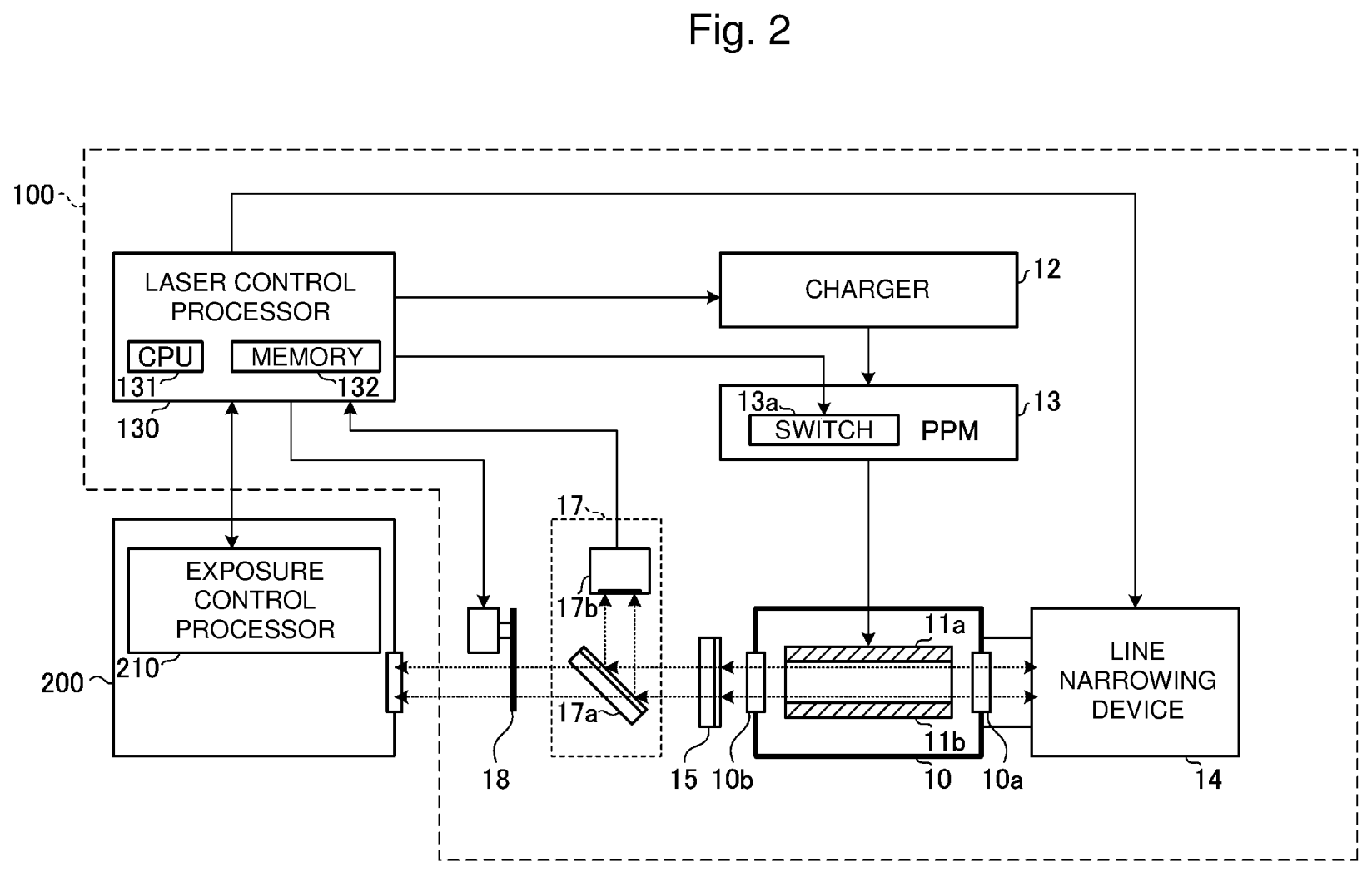

FIGS. 1 and 2 schematically illustrate the configuration of an exposure system in a comparative example. The comparative example of the present disclosure is an example that the applicant recognizes as known only by the applicant, but is not a publicly known example that is recognized by the applicant.

The exposure system includes a laser apparatus 100 and an exposure apparatus 200. In FIG. 1, the laser apparatus 100 is simplified. In FIG. 2, the exposure apparatus 200 is simplified.

The laser apparatus 100 includes a laser control processor 130. The laser apparatus 100 outputs a pulse laser beam toward the exposure apparatus 200.

1.2 Exposure Apparatus 200

1.2.1 Configuration

As illustrated in FIG. 1, the exposure apparatus 200 includes an illumination optical system 201, a projection optical system 202, and an exposure control processor 210.

The illumination optical system 201 illuminates a reticle pattern of a non-illustrated reticle disposed on a reticle stage RT with the pulse laser beam incident from the laser apparatus 100.

The pulse laser beam having transmitted through the reticle is imaged on a non-illustrated workpiece disposed on a workpiece table WT by reduced projection through the projection optical system 202. The workpiece is a photosensitive substrate such as a semiconductor wafer to which a resist film is applied.

The exposure control processor 210 is a processing device including a memory 212 in which a control program is stored and a central processing unit (CPU) 211 configured to execute the control program. The exposure control processor 210 is specially configured or programmed to execute various kinds of processing included in the present disclosure. The exposure control processor 210 collectively controls the exposure apparatus 200 and transmits and receives various kinds of data and various signals to and from the laser control processor 130.

1.2.2 Operation

The exposure control processor 210 sets various parameters related to exposure conditions and controls the illumination optical system 201 and the projection optical system 202.

The exposure control processor 210 transmits data of a target wavelength, data of a pulse energy target value, and a trigger signal to the laser control processor 130. The laser control processor 130 controls the laser apparatus 100 in accordance with those data and signals.

The exposure control processor 210 translates the reticle stage RT and the workpiece table WT in directions opposite to each other in synchronization. Accordingly, the workpiece is exposed to the pulse laser beam reflected by the reticle pattern.

Through such an exposure process, the reticle pattern is transferred to the semiconductor wafer. Thereafter, an electronic device can be manufactured through a plurality of processes.

1.3 Laser Apparatus 100

1.3.1 Configuration

As illustrated in FIG. 2, the laser apparatus 100 includes a laser chamber 10, a charger 12, a pulse power module (PPM) 13, a line narrowing device 14, an output coupling mirror 15, an optical meter 17, and a shutter 18 in addition to the laser control processor 130. The line narrowing device 14 and the output coupling mirror 15 constitute an optical resonator.

The laser chamber 10 is disposed on the optical path of the optical resonator. The laser chamber 10 is provided with windows 10a and 10b.

The laser chamber 10 includes a pair of electrodes 11a and 11b inside and houses laser gas as a laser medium. The laser medium is, for example, $F_2$, ArF, KrF, XeCl, or XeF.

The charger 12 stores electric energy to be supplied to the pulse power module 13. The pulse power module 13 includes a switch 13a.

The line narrowing device 14 includes wavelength selection elements such as prisms 41 and 42 and gratings 51 and 52 to be described later. The line narrowing device 14 is called a line narrowing module in some cases.

The output coupling mirror 15 is a partially reflective mirror.

The optical meter 17 includes a beam splitter 17a and a sensor unit 17b. The beam splitter 17a is disposed on the optical path of a pulse laser beam output from the output coupling mirror 15. The beam splitter 17a transmits part of the pulse laser beam at high transmittance and reflects another part of the pulse laser beam into the sensor unit 17b.

The sensor unit 17*b* includes an energy sensor 17*e* and spectroscopic sensors 17*f* and 17*g* to be described later with reference to FIG. 5.

The shutter 18 is disposed on the optical path of the pulse laser beam having transmitted through the beam splitter 17*a*. When the shutter 18 is closed, the pulse laser beam having transmitted through the beam splitter 17*a* is cut off not to enter the exposure apparatus 200. When the shutter 18 is opened, the pulse laser beam having transmitted through the beam splitter 17*a* is not cut off but enters the exposure apparatus 200.

The laser control processor 130 is a processing device including a memory 132 in which a control program is stored and a CPU 131 configured to execute the control program. The laser control processor 130 is specially configured or programmed to execute various kinds of processing included in the present disclosure. The memory 132 corresponds to a storage device in the present disclosure.

1.3.2 Operation

The laser control processor 130 acquires data of the target wavelength from the exposure control processor 210. The laser control processor 130 transmits an initial setting signal to the line narrowing device 14 based on the target wavelength. After the output of the pulse laser beam is started, the laser control processor 130 receives wavelength measured data from the optical meter 17 and transmits a feedback control signal to the line narrowing device 14 based on the target wavelength and the wavelength measured data.

The laser control processor 130 acquires data of the pulse energy target value from the exposure control processor 210. The laser control processor 130 transmits an initial setting signal of a charging voltage V to the charger 12 based on the pulse energy target value. After the output of the pulse laser beam is started, the laser control processor 130 receives pulse energy measured data from the optical meter 17 and transmits a feedback control signal of the charging voltage V to the charger 12 based on the pulse energy target value and the pulse energy measured data.

The laser control processor 130 receives the trigger signal from the exposure control processor 210. The laser control processor 130 transmits an oscillation trigger signal based on the trigger signal to the switch 13*a* of the pulse power module 13.

When having received the oscillation trigger signal from the laser control processor 130, the switch 13*a* is turned on. When the switch 13*a* is turned on, the pulse power module 13 generates high voltage in pulses from the electric energy stored in the charger 12. The pulse power module 13 applies the high voltage to the electrodes 11*a* and 11*b*.

When the high voltage is applied to the electrodes 11*a* and 11*b*, discharging occurs between the electrodes 11*a* and 11*b*. The laser gas in the laser chamber 10 is excited by energy of the discharging and transitions to a higher energy level. Thereafter, when transitioning to a lower energy level, the excited laser gas discharges light of a wavelength in accordance with the difference between the energy levels.

The light generated in the laser chamber 10 is output from the laser chamber 10 through the windows 10*a* and 10*b*. The light output through the window 10*a* is incident as an optical beam on the line narrowing device 14. Light having a wavelength near a desired wavelength in the light incident on the line narrowing device 14 is reflected by the line narrowing device 14 and returned to the laser chamber 10.

The output coupling mirror 15 transmits and outputs part of the light output out through the window 10*b* and reflects and returns another part thereof to the laser chamber 10.

In this manner, light output from the laser chamber 10 reciprocates between the line narrowing device 14 and the output coupling mirror 15. The light is amplified each time the light passes through a discharge space between the pair of electrodes 11*a* and 11*b*. In this manner, light provided with laser oscillation and line narrowing is output as a pulse laser beam from the output coupling mirror 15.

The pulse laser beam output from the laser apparatus 100 enters the exposure apparatus 200.

1.4 Line Narrowing Device 14

1.4.1 Configuration

Figure 3:
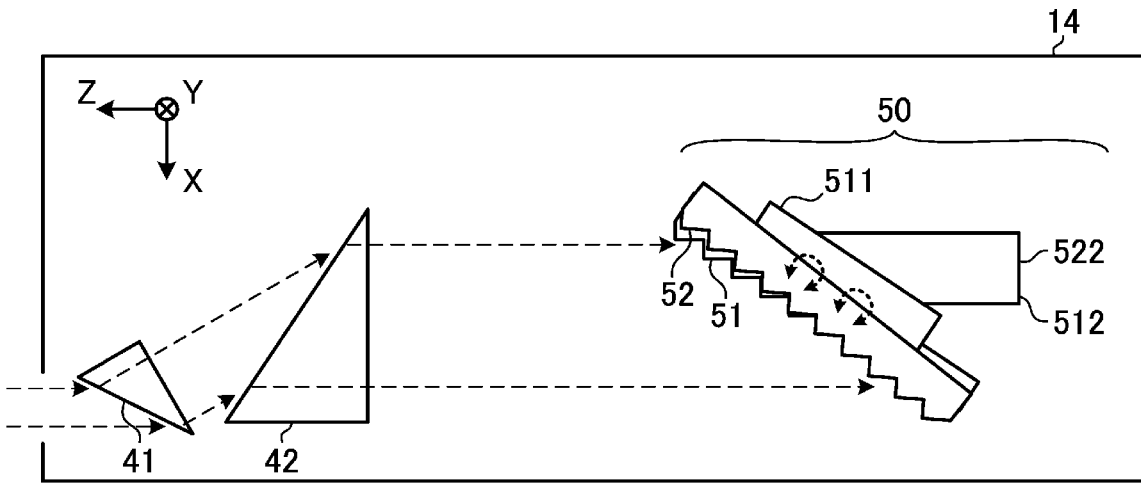
FIG. 3 schematically illustrates the configuration of a line narrowing device in the comparative example.
Figure 4:
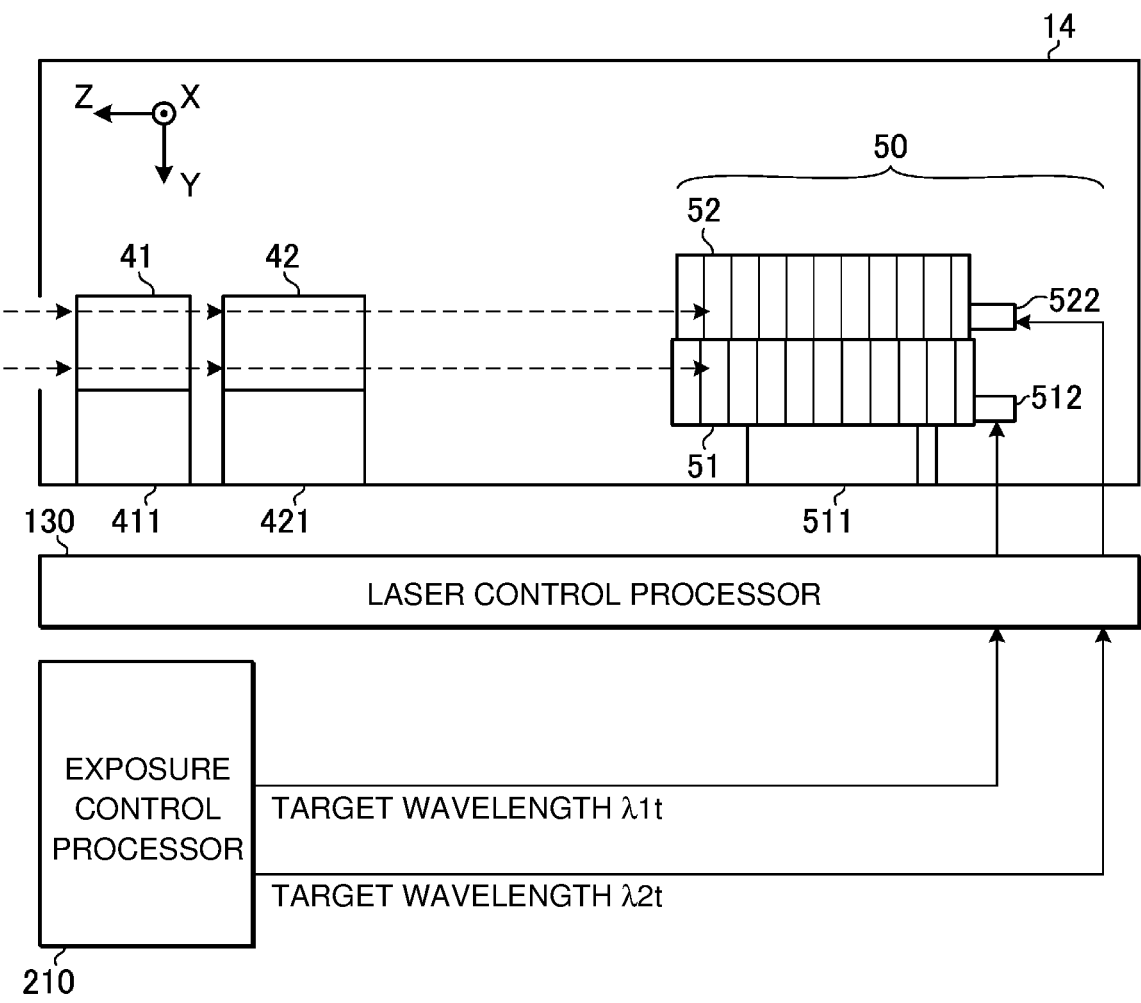
FIG. 4 schematically illustrates the configuration of the line narrowing device in the comparative example.

FIGS. 3 and 4 schematically illustrate the configuration of the line narrowing device 14 in the comparative example. An X axis, a Y axis, and a Z axis that are orthogonal to one another are illustrated in each of FIGS. 3 and 4. FIG. 3 illustrates the line narrowing device 14 viewed in the positive Y direction, and FIG. 4 illustrates the line narrowing device 14 viewed in the negative X direction. The positive Y direction and the negative Y direction match directions in which the electrodes 11*a* and 11*b* (refer to FIG. 2) face each other. The negative Z direction matches the traveling direction of an optical beam output through the window 10*a*. The positive Z direction matches the traveling direction of a pulse laser beam output from the window 10*b* and then output through the output coupling mirror 15.

The line narrowing device 14 includes the prisms 41 and 42 and a grating system 50.

1.4.1.1 Prisms 41 and 42

The prism 41 is disposed on the optical path of the optical beam output through the window 10*a*. The prism 41 is supported by a holder 411.

The prism 42 is disposed on the optical path of the optical beam having passed through the prism 41. The prism 42 is supported by a holder 421.

The prisms 41 and 42 are disposed such that surfaces of the prisms 41 and 42 that the optical beam is incident on and output from are all parallel to the Y axis.

1.4.1.2 Grating System 50

The grating system 50 includes the gratings 51 and 52. The gratings 51 and 52 are disposed at positions different from each other in the direction of the Y axis on the optical path of the optical beam having passed through the prism 42. The direction of grooves of the gratings 51 and 52 matches the direction of the Y axis. The positions of the gratings 51 and 52 are set such that the optical beam having passed through the prism 42 is incident across the gratings 51 and 52.

The gratings 51 and 52 are supported by a holder 511. The grating 51 is rotatable about an axis parallel to the Y axis by a first rotation stage 512. The grating 52 is rotatable about an axis parallel to the Y axis by a second rotation stage 522.

1.4.2 Operation

The traveling direction of the optical beam output through the window 10*a* is changed in a plane parallel to an XZ plane that is orthogonal to the Y axis by each of the prisms 41 and 42, and the beam width of the optical beam is expanded in the plane parallel to the XZ plane. The traveling direction of the optical beam having passed through both the prisms 41 and 42 and traveling toward the gratings 51 and 52 substantially matches the negative Z direction, for example.

The light incident on the gratings 51 and 52 from the prism 42 is reflected by the grooves of each of the gratings 51 and 52 and is diffracted in a direction in accordance with the wavelength of the light. Accordingly, the light reflected by the grooves of each of the gratings 51 and 52 is dispersed in a plane parallel to the XZ plane. The grating 51 is disposed in Littrow arrangement such that the incident angle of the optical beam incident on the grating 51 from the prism 42 matches the diffracting angle of diffracted light of a desired wavelength λ1. The grating 52 is disposed in Littrow arrangement such that the incident angle of the optical beam incident on the grating 52 from the prism 42 matches the diffracting angle of diffracted light of a desired wavelength λ2. When the incident angles of the optical beams incident on the gratings 51 and 52 from the prism 42 are different from each other, a wavelength difference occurs between the wavelength λ1 of the diffracted light returned from the grating 51 to the prism 42 and the wavelength λ2 of the diffracted light returned from the grating 52 to the prism 42.

Although only optical beams in a direction from the prism 41 to the gratings 51 and 52 are illustrated with dashed line arrows in FIGS. 3 and 4, an optical beam of a wavelength selected by the line narrowing device 14 travels from the gratings 51 and 52 toward the prism 41 through paths opposite to the dashed line arrows.

The prisms 42 and 41 reduce the beam width of light returned from the gratings 51 and 52 in a plane parallel to the XZ plane and return the light into the laser chamber 10 through the window 10a.

The first rotation stage 512 and the second rotation stage 522 are controlled by the laser control processor 130.

When the first rotation stage 512 slightly rotates the grating 51, the incident angle of the optical beam incident on the grating 51 from the prism 42 slightly changes. As a result, the wavelength λ1 changes.

When the second rotation stage 522 slightly rotates the grating 52, the incident angle of the optical beam incident on the grating 52 from the prism 42 slightly changes. As a result, the wavelength λ2 changes.

The exposure control processor 210 transmits the values of a target wavelength λ1t of the wavelength λ1 and a target wavelength λ2t of the wavelength λ2 to the laser control processor 130. The wavelengths λ1 and λ2 are wavelengths with which, for example, images are formed at two positions on the upper and bottom surfaces, respectively, of the resist film applied to the semiconductor wafer.

The laser control processor 130 controls the first rotation stage 512 based on the target wavelength λ1t. Accordingly, the first rotation stage 512 changes the posture of the grating 51, thereby adjusting the incident angle of the optical beam on the grating 51.

The laser control processor 130 controls the second rotation stage 522 based on the target wavelength λ2t. Accordingly, the second rotation stage 522 changes the posture of the grating 52, thereby adjusting the incident angle of the optical beam on the grating 52.

With the above-described configuration and operation, light of the wavelength λ1 and light of the wavelength λ2 in an optical beam output through the window 10a of the laser chamber 10 are selected and returned into the laser chamber 10. Accordingly, the laser apparatus 100 can perform two-wavelength oscillation. The wavelengths λ1 and λ2 may be separately set by controlling the first rotation stage 512 and the second rotation stage 522.

A pulse laser beam subjected to the two-wavelength oscillation and output from the laser apparatus 100 includes two wavelength components of the wavelengths λ1 and λ2. The pulse laser beam includes pulses in which a first pulse laser beam having the wavelength λ1 and a second pulse laser beam having the wavelength λ2 temporally and spatially overlap. Alternatively, the first pulse laser beam having the wavelength λ1 and the second pulse laser beam having the wavelength λ2 may temporally overlap but not spatially overlap.

A focal length in the exposure apparatus 200 (refer to FIG. 1) depends on the wavelength of a pulse laser beam. A pulse laser beam subjected to the two-wavelength oscillation and output from the laser apparatus 100 can be imaged at two different positions in the direction of the optical path axis of the pulse laser beam on the workpiece table WT of the exposure apparatus 200, and a focal point depth can be increased in effect. For example, even when a resist film having a large film thickness is exposed, it is possible to maintain imaging performance in the thickness direction of the resist film.

1.5 Optical Meter 17

1.5.1 Configuration

Figure 5:
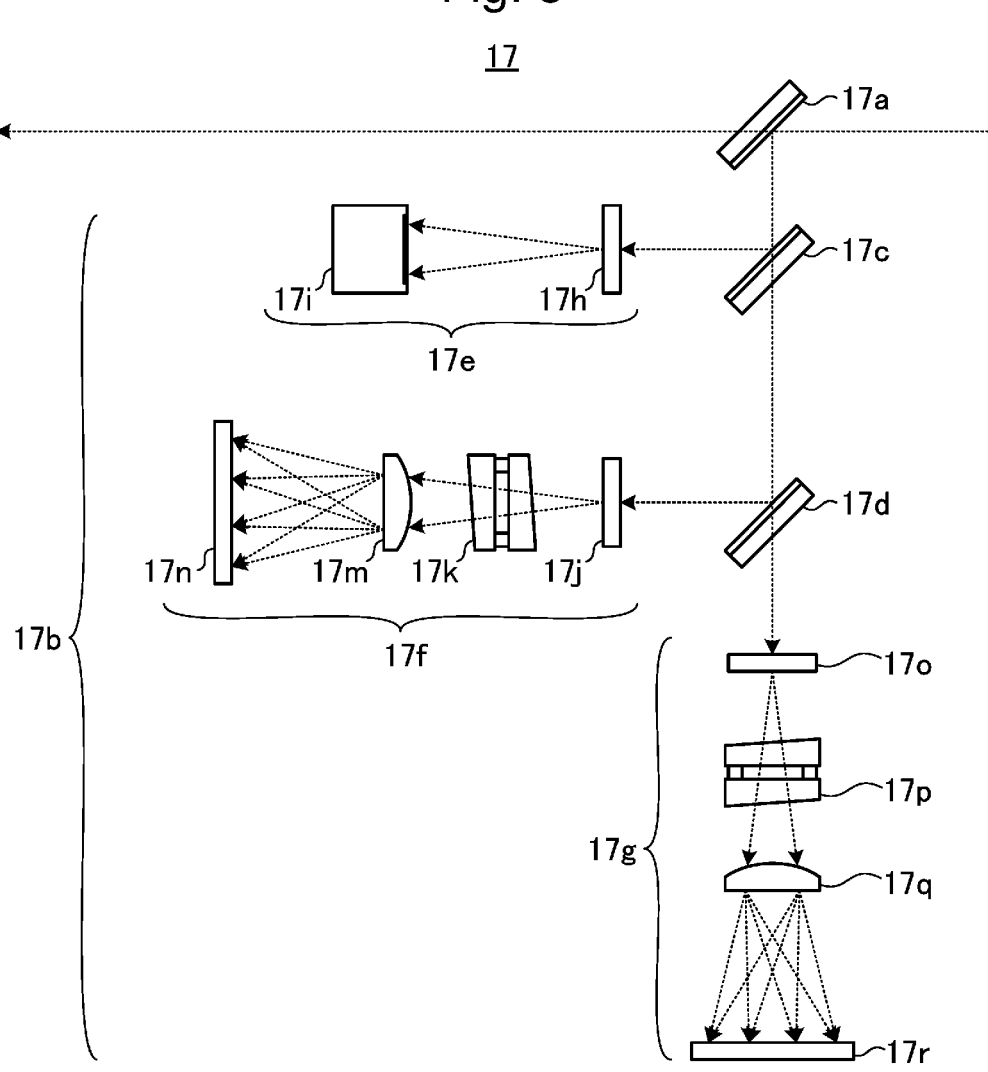
FIG. 5 schematically illustrates the configuration of an optical meter in the comparative example.

FIG. 5 schematically illustrates the configuration of the optical meter 17 in the comparative example. The sensor unit 17b included in the optical meter 17 includes beam splitters 17c and 17d, the energy sensor 17e, and the spectroscopic sensors 17f and 17g. The beam splitter 17c is disposed on the optical path of a pulse laser beam reflected by the beam splitter 17a, reflects part of the pulse laser beam, and transmits another part thereof.

The energy sensor 17e is disposed on the optical path of the pulse laser beam reflected by the beam splitter 17c. The energy sensor 17e includes a diffusion plate 17h and a photodiode 17i.

The beam splitter 17d is disposed on the optical path of the pulse laser beam having transmitted through the beam splitter 17c, reflects part of the pulse laser beam, and transmits another part thereof.

The spectroscopic sensor 17f is disposed on the optical path of the pulse laser beam reflected by the beam splitter 17d. The spectroscopic sensor 17f includes a diffusion plate 17j, an etalon 17k, a light condensing lens 17m, and an image sensor 17n.

The spectroscopic sensor 17g is disposed on the optical path of the pulse laser beam having transmitted through the beam splitter 17d. The spectroscopic sensor 17g includes a diffusion plate 17o, an etalon 17p, a light condensing lens 17q, and an image sensor 17r.

1.5.2 Operation

In the energy sensor 17e, the pulse laser beam having transmitted through the diffusion plate 17h is incident on the photodiode 17i. The photodiode 17i generates current in accordance with the light intensity of the pulse laser beam. The pulse energy of the pulse laser beam is obtained by integrating the current for a time corresponding to one pulse of the pulse laser beam.

In the spectroscopic sensor 17f, the pulse laser beam having transmitted through the diffusion plate 17j, the etalon 17$k$, and the light condensing lens 17$m$ in the stated order forms an interference fringe on the image sensor 17$n$.

Figure 6:
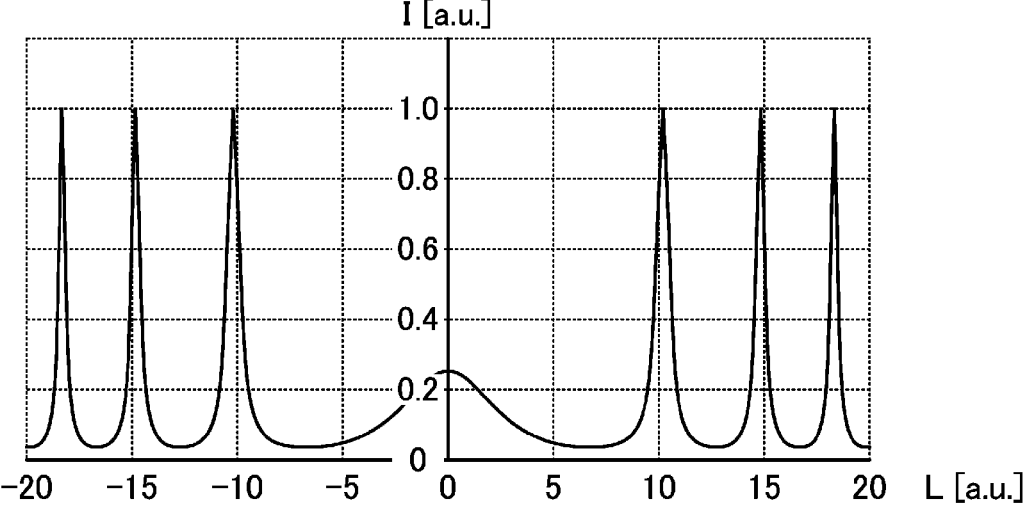
FIG. 6 is a graph illustrating an exemplary result of interference fringe measurement by a spectroscopic sensor included in the optical meter.

FIG. 6 is a graph illustrating an exemplary result of interference fringe measurement by the spectroscopic sensor 17$f$ included in the optical meter 17. In FIG. 6 and FIGS. 7, 8, and 19 to 21 to be described later, the horizontal axis represents a radius L of the interference fringe, and the vertical axis represents light intensity I. Units on the axes are optional. The central wavelength of the pulse laser beam can be calculated from a value on the L axis at which the light intensity I has a peak.

Operation of the spectroscopic sensor 17$g$ is the same as operation of the spectroscopic sensor 17$f$. In each of the spectroscopic sensors 17$g$ and 17$f$, the radius L of the interference fringe periodically changes in accordance with wavelength change of the pulse laser beam. The range of wavelength change corresponding to one period of the periodic change is referred to as a free-spectral range (FSR). When the free-spectral range of the spectroscopic sensor 17$g$ is larger than the free-spectral range of the spectroscopic sensor 17$f$, wavelength measurement in a wide range can be performed by the spectroscopic sensor 17$g$ and wavelength measurement at high accuracy can be performed by the spectroscopic sensor 17$f$. These wavelength measurements can be combined to perform wavelength measurement in a wide range at high accuracy.

1.6 Problem with Comparative Example

Figure 7:
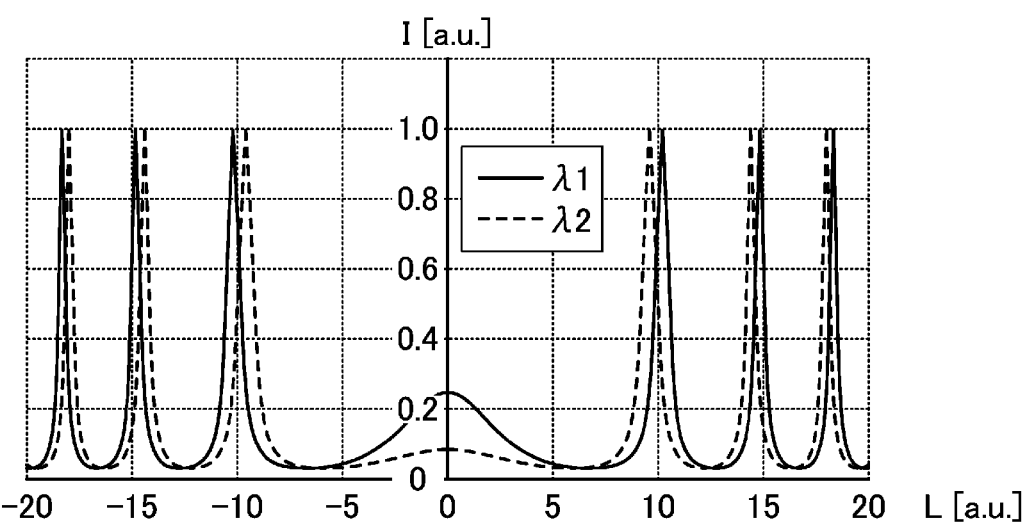
FIG. 7 is a graph illustrating an exemplary result of interference fringe measurement when a pulse laser beam of a wavelength λ1 and a pulse laser beam of a wavelength λ2 are separately incident on the spectroscopic sensor.

FIG. 7 is a graph illustrating an exemplary result of interference fringe measurement when a pulse laser beam of the wavelength λ1 and a pulse laser beam of the wavelength λ2 are separately incident on the spectroscopic sensor 17$f$. When the wavelengths λ1 and λ2 are close to each other but separately measured, the wavelengths can be accurately measured by specifying peaks of the light intensity I.

Figure 8:
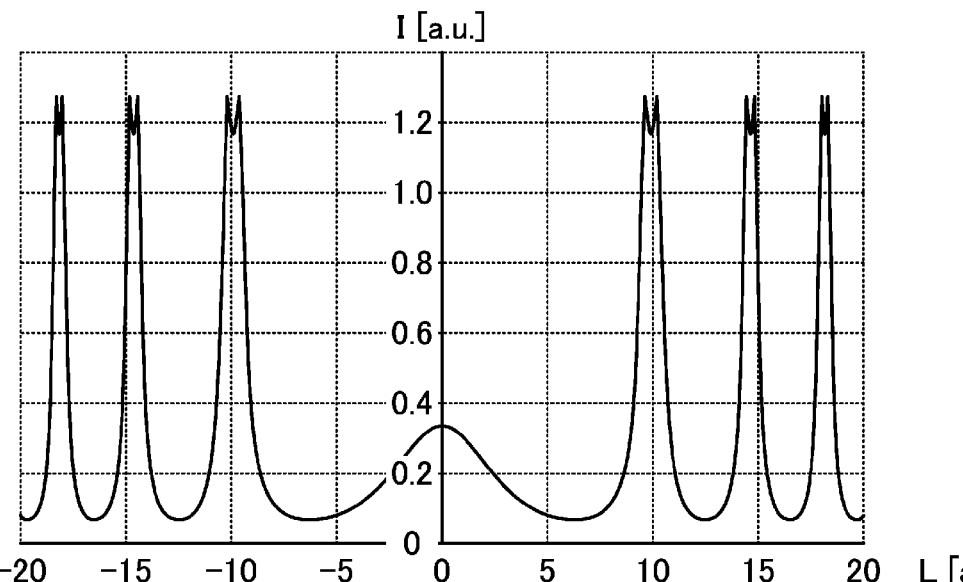
FIG. 8 is a graph illustrating an exemplary result of interference fringe measurement when the pulse laser beam of the wavelength λ1 and the pulse laser beam of the wavelength λ2 are simultaneously incident on the spectroscopic sensor.

FIG. 8 is a graph illustrating an exemplary result of interference fringe measurement when the pulse laser beam of the wavelength λ1 and the pulse laser beam of the wavelength λ2 are simultaneously incident on the spectroscopic sensor 17$f$. The waveform illustrated in FIG. 8 is substantially equivalent to a synthesis waveform of the waveform of the interference fringe of the wavelength λ1 and the waveform of the interference fringe of the wavelength λ2 in FIG. 7. When the wavelengths λ1 and λ2 are close to each other, it is difficult to specify peaks of the light intensity I based on the measurement result illustrated in FIG. 8 in some cases. In such a case, it is difficult to measure the wavelengths λ1 and λ2.

In embodiments described below, encoders 513 and 523 are attached to the first rotation stage 512 that changes the wavelength λ1 and the second rotation stage 522 that changes the wavelength λ2, respectively. A first relation λ1θ1 between a position θ1 of the first rotation stage 512 and the wavelength λ1 and a second relation λ2θ2 between a position θ2 of the second rotation stage 522 and the wavelength λ2 are stored in the memory 132. The first rotation stage 512 is controlled based on the first relation λ1θ1 and the position θ1 of the first rotation stage 512 measured by the encoder 513, and the second rotation stage 522 is controlled based on the second relation λ2θ2 and the position θ2 of the second rotation stage 522 measured by the encoder 523.

2. LASER APPARATUS CONFIGURED TO ADJUST WAVELENGTH BY CONTROLLING ROTATION STAGE BASED ON ENCODER OUTPUT

2.1 Configuration

Figure 9:
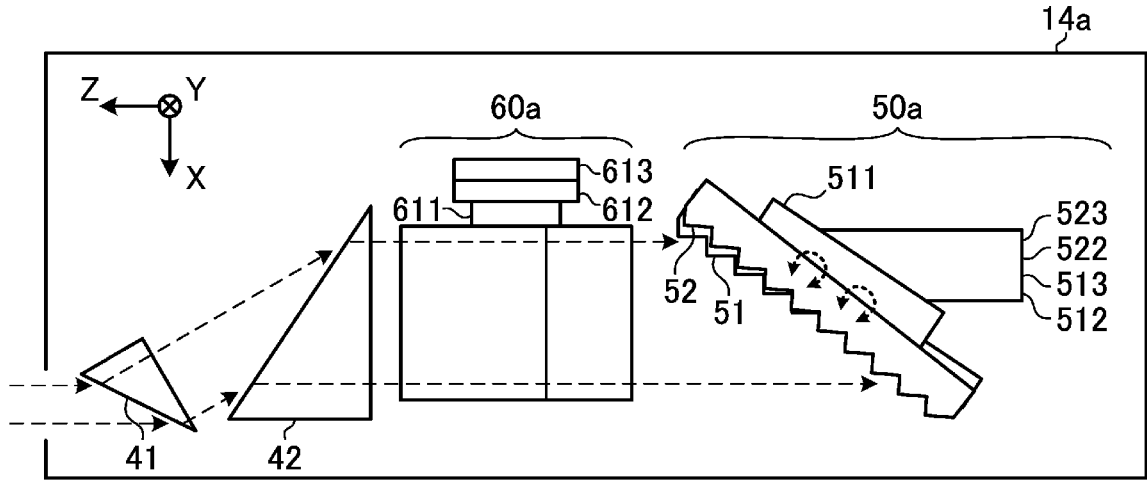
FIG. 9 schematically illustrates the configuration of a line narrowing device in a first embodiment.
Figure 10:
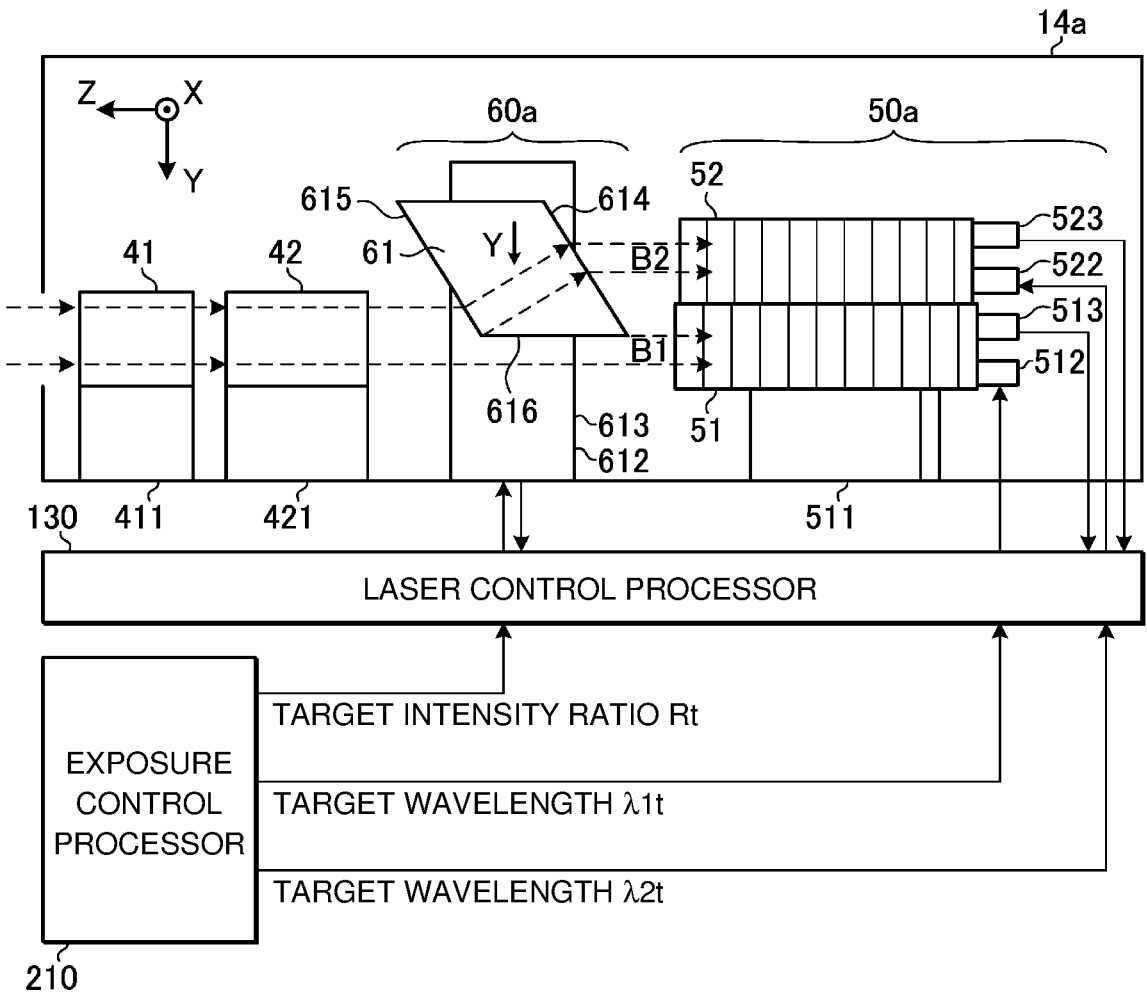
FIG. 10 schematically illustrates the configuration of the line narrowing device in the first embodiment.

FIGS. 9 and 10 schematically illustrate the configuration of a line narrowing device 14$a$ in a first embodiment. FIG. 9 illustrates the line narrowing device 14$a$ viewed in the positive Y direction, and FIG. 10 illustrates the line narrowing device 14$a$ viewed in the negative X direction.

The line narrowing device 14$a$ includes a grating system 50$a$ in place of the grating system 50. The line narrowing device 14$a$ includes a beam separation optical system 60$a$ between the prism 42 and the grating system 50$a$.

In the grating system 50$a$, the encoder 513 is attached to the first rotation stage 512 of the grating 51. The encoder 523 is attached to the second rotation stage 522 of the grating 52. The first rotation stage 512 and the encoder 513 are separated from each other in FIG. 10 but may be integrated as described later with reference to FIG. 13. This is the same for the second rotation stage 522 and the encoder 523.

In the first embodiment, the grating 51 corresponds to a first optical element in the present disclosure, and the grating 52 corresponds to a second optical element in the present disclosure. The first rotation stage 512 corresponds to a first actuator in the present disclosure, and the second rotation stage 522 corresponds to a second actuator in the present disclosure. The encoder 513 corresponds to a first encoder in the present disclosure, and the encoder 523 corresponds to a second encoder in the present disclosure.

The beam separation optical system 60$a$ includes a parallel plane substrate 61.

The parallel plane substrate 61 can be disposed at a position partially overlapping a section of the optical path of the optical beam having passed through the prism 42. The parallel plane substrate 61 is supported by a holder 611. The parallel plane substrate 61 can be moved in the negative Y direction and the positive Y direction by a linear stage 612. An encoder 613 is attached to the linear stage 612.

In the first embodiment, the linear stage 612 corresponds to a third actuator in the present disclosure. The encoder 613 corresponds to a third encoder in the present disclosure.

The parallel plane substrate 61 has an incident surface 615 on which part of the optical beam having passed through the prism 42 is incident, and an output surface 614 through which the light incident on the parallel plane substrate 61 through the incident surface 615 is output from inside the parallel plane substrate 61 toward the grating 52 (refer to FIG. 10). The incident surface 615 and the output surface 614 are both parallel to the X axis and tilted relative to the Y axis. The incident surface 615 and the output surface 614 are parallel to each other.

The parallel plane substrate 61 also has an end face 616 on the positive Y side. The end face 616 has an acute angle relative to the output surface 614. The end face 616 may be parallel to the XZ plane.

2.2 Operation

As illustrated in FIG. 10, a first part B1 of the optical beam having passed through the prism 42 passes outside the parallel plane substrate 61 and is incident on the grating 51, and a second part B2 of the optical beam transmits inside the parallel plane substrate 61 and is incident on the grating 52. In this case, the parallel plane substrate 61 shifts the optical path axis of the second part B2 of the optical beam in the negative Y direction relative to the optical path axis of the first part B1.

The amount of light incident on the grating 52 increases as the linear stage 612 moves the parallel plane substrate 61 in the positive Y direction to increase the second part B2 of the optical beam, which is incident on the parallel plane substrate 61.

The amount of light incident on the grating 52 decreases as the linear stage 612 moves the parallel plane substrate 61 in the negative Y direction to decrease the second part B2 of the optical beam, which is incident on the parallel plane substrate 61.

In this manner, the proportion between the first part B1 and the second part B2 changes and an intensity ratio R between the wavelengths $\lambda 1$ and $\lambda 2$ changes as the linear stage 612 changes the position of the parallel plane substrate 61 in the direction of the Y axis.

The direction in which the parallel plane substrate 61 is moved by the linear stage 612 may be different from the direction of the Y axis. The linear stage 612 may move the parallel plane substrate 61 in a direction intersecting the XZ plane orthogonal to the Y axis.

The exposure control processor 210 transmits the target wavelength $\lambda 1t$, the target wavelength $\lambda 2t$, and a target intensity ratio Rt to the laser control processor 130.

The laser control processor 130 controls the first rotation stage 512 based on the target wavelength $\lambda 1t$. Accordingly, the first rotation stage 512 changes the posture of the grating 51, thereby adjusting the wavelength $\lambda 1$ selected by the grating 51.

The laser control processor 130 controls the second rotation stage 522 based on the target wavelength $\lambda 2t$. Accordingly, the second rotation stage 522 changes the posture of the grating 52, thereby adjusting the wavelength $\lambda 2$ selected by the grating 52.

The laser control processor 130 controls the linear stage 612 based on the target intensity ratio Rt. Accordingly, the linear stage 612 adjusts the position of the parallel plane substrate 61, thereby adjusting the intensity ratio R between the wavelengths $\lambda 1$ and $\lambda 2$.

Figure 11:
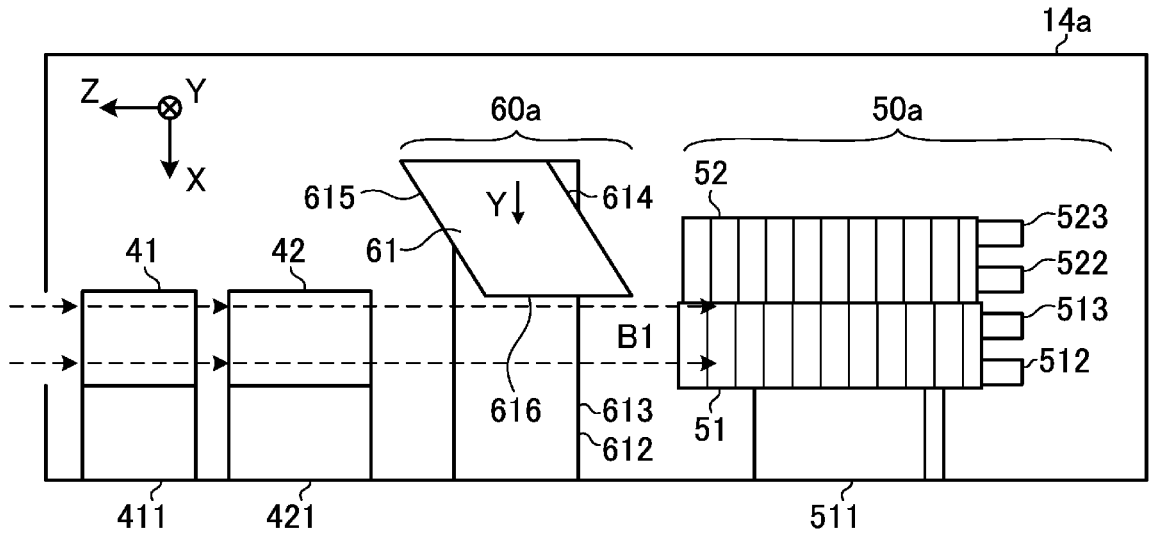
FIG. 11 illustrates disposition of a parallel plane substrate when the entire optical beam is incident as a first part on a grating in the first embodiment.

FIG. 11 illustrates disposition of the parallel plane substrate 61 when the entire optical beam is incident as the first part B1 on the grating 51 in the first embodiment. The linear stage 612 may set the proportion of the second part B2 to the first part B1 to zero by retracting the parallel plane substrate 61 from the optical path of the optical beam.

Figure 12:
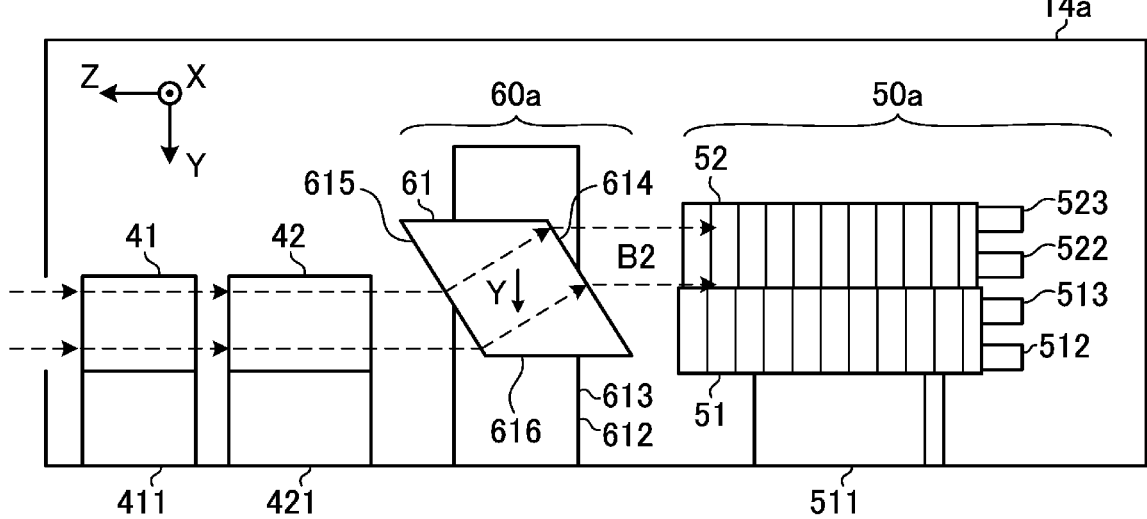
FIG. 12 illustrates disposition of the parallel plane substrate when the entire optical beam is incident as a second part on the grating in the first embodiment.

FIG. 12 illustrates disposition of the parallel plane substrate 61 when the entire optical beam is incident as the second part B2 on the grating 52 in the first embodiment. The linear stage 612 may set the proportion of the first part B1 to the second part B2 to zero by disposing the parallel plane substrate 61 at a position that the entire optical beam passes.

2.3 Example of Encoder

Figure 13:
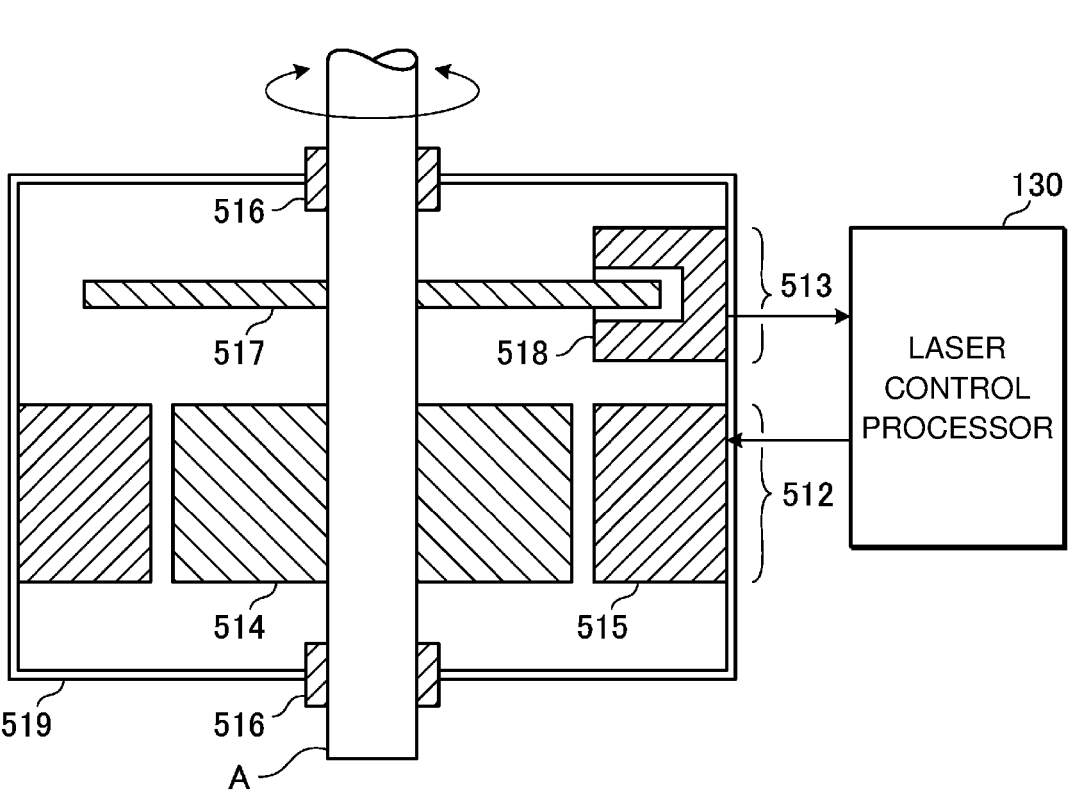
FIG. 13 illustrates an exemplary configuration of a first rotation stage and an encoder in the first embodiment.

FIG. 13 illustrates an exemplary configuration of the first rotation stage 512 and the encoder 513 in the first embodiment. The first rotation stage 512 and the encoder 513 may be housed in a common housing 519.

The first rotation stage 512 includes a rotor 514 and a stator 515. The rotor 514 is fixed to a rotation shaft A supported to a bearing 516 and rotates with the rotation shaft A. Although details of the rotor 514 and the stator 515 are not illustrated, for example, the rotor 514 includes a permanent magnet and the stator 515 includes an electromagnet.

The rotor 514 rotates as a magnetic field generated by the electromagnet of the stator 515 is switched.

The encoder 513 includes a circular disk 517 and a measurement head 518. The circular disk 517 is fixed to the rotation shaft A and rotates with the rotation shaft A. Although details of the circular disk 517 and the measurement head 518 are not illustrated, the circular disk 517 includes a hologram diffracting lattice, for example. The measurement head 518 includes, for example, a laser diode, an optical system in which positive first-order diffracted light and negative first-order diffracted light of light output from the laser diode, which are generated through the hologram diffracting lattice, interfere with each other, and a photo detector configured to measure the interference light.

As the rotation shaft A is rotated by the first rotation stage 512, the circular disk 517 rotates and the hologram diffracting lattice moves relative to the measurement head 518 in the circumferential direction of the circular disk 517. The intensity of the interference light relative to a distance by which the hologram diffracting lattice moves has a change pattern that is substantially the same as a sine curve. Thus, a movement distance shorter than the length of one pitch of the hologram diffracting lattice can be measured at high accuracy by measuring the intensity of the interference light.

A disclosed optical system is devised such that brightness and darkness of the interference light are repeated a plurality of times for each movement by one pitch of the hologram diffracting lattice. Further resolution improvement can be achieved by using such an optical system.

Although the example of the first rotation stage 512 and the encoder 513 is illustrated in FIG. 13, the same description applies to the second rotation stage 522 and the encoder 523.

The linear stage 612 is different from the first rotation stage 512 in that the linear stage 612 linearly moves the parallel plane substrate 61 instead of rotating the grating 51, and the encoder 613 is different from the encoder 513 in that the hologram diffracting lattice moves straight instead of moving in the circumferential direction. However, the same principle of measurement of the movement distance of the hologram diffracting lattice by the encoder 513 applies to the encoder 613, and thus detailed description thereof is omitted.

2.4 Example of Intensity Ratio R

Figure 14:
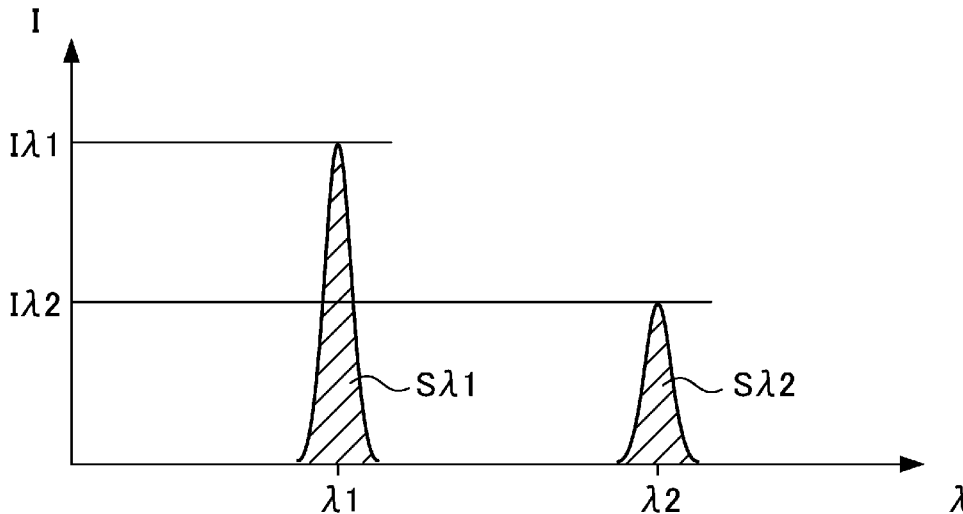
FIG. 14 is a graph illustrating an exemplary spectrum waveform of a pulse laser beam output from a laser apparatus in the first embodiment.

FIG. 14 is a graph illustrating an exemplary spectrum waveform of a pulse laser beam output from the laser apparatus 100 in the first embodiment. In FIG. 14, the horizontal axis represents a wavelength $\lambda$, and the vertical axis represents the light intensity I. The pulse laser beam includes a wavelength component of the wavelength $\lambda 1$ and a wavelength component of the wavelength $\lambda 2$. The wavelength $\lambda 1$ corresponds to a first wavelength component in the present disclosure, and the wavelength $\lambda 2$ corresponds to a second wavelength component in the present disclosure.

When $E\lambda 1$ represents pulse energy E of the wavelength component of the wavelength $\lambda 1$ and $E\lambda 2$ represents pulse energy E of the wavelength component of the wavelength $\lambda 2$, the intensity ratio R between the wavelength component of the wavelength $\lambda 1$ and the wavelength component of the wavelength $\lambda 2$ is defined by an expression below.

$$R = E\lambda 1/(E\lambda 1 + E\lambda 2)$$

Alternatively, the intensity ratio R may be defined by an expression below.

$$R = E\lambda 1/E\lambda 2$$

Alternatively, the intensity ratio R may be expressed as the ratio $E\lambda1:E\lambda2$.

In the spectrum waveform illustrated in FIG. 14, $S\lambda1$ represents an integration value S of the light intensity I of a wavelength component having a central wavelength at the wavelength $\lambda1$, and $S\lambda2$ represents an integration value S of the light intensity I of a wavelength component having a central wavelength at the wavelength $\lambda2$. The intensity ratio R may be defined by an expression below.

$$R=S\lambda1/(S\lambda1+S\lambda2)$$

Alternatively, the intensity ratio R may be defined by an expression below.

$$R=S\lambda1/S\lambda2$$

Alternatively, the intensity ratio R may be expressed as the ratio $S\lambda1:S\lambda2$.

When the wavelength component having a central wavelength at the wavelength $\lambda1$ and the wavelength component having a central wavelength at the wavelength $\lambda2$ have the same spectrum line width, the peak value of the light intensity I and the integration value S are proportional to each other for the wavelength components. Thus, when $I\lambda1$ represents the peak value of the light intensity I of the wavelength component of the wavelength $\lambda1$ and $I\lambda2$ represents the peak value of the light intensity I of the wavelength component of the wavelength $\lambda2$, the intensity ratio R may be defined by an expression below.

$$R=I\lambda1/(I\lambda1+I\lambda2)$$

Alternatively, the intensity ratio R may be defined by an expression below.

$$R=I\lambda1/I\lambda2$$

Alternatively, the intensity ratio R may be expressed as the ratio $I\lambda1:I\lambda2$.

2.5 Operation of Laser Control Processor 130

2.5.1 Main Flow

Figure 15:
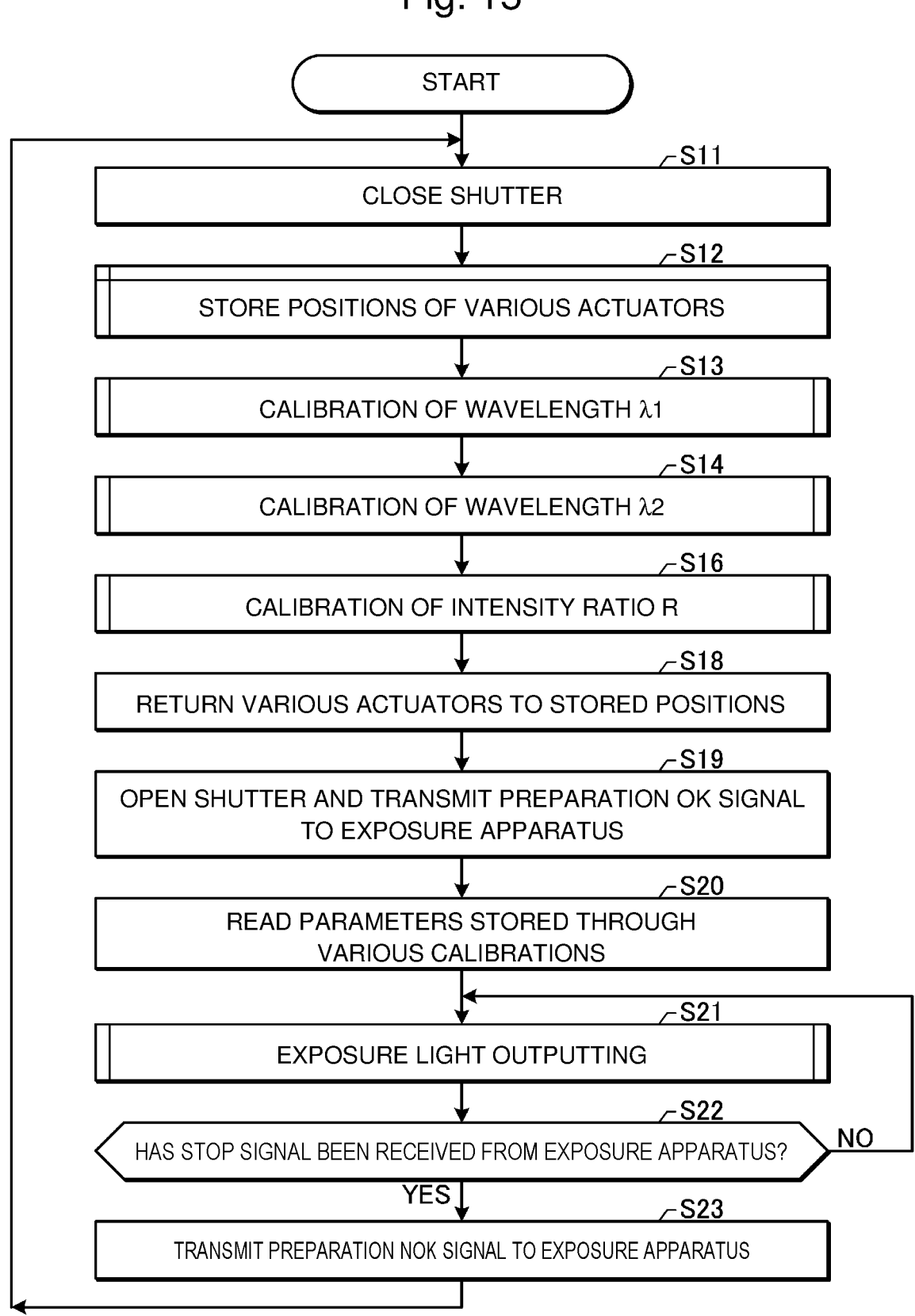
FIG. 15 is a flowchart illustrating operation of a laser control processor in the first embodiment.

FIG. 15 is a flowchart illustrating operation of the laser control processor 130 in the first embodiment. As described below, after having acquired data for control of the wavelengths $\lambda1$ and $\lambda2$ and control of the intensity ratio R, the laser control processor 130 controls the laser apparatus 100 so that exposure light is output.

At S11, the laser control processor 130 closes the shutter 18. Accordingly, no pulse laser beam is incident on the exposure apparatus 200.

At S12, the laser control processor 130 stores the positions of various actuators measured by various encoders. The various actuators include the first rotation stage 512, the second rotation stage 522, and the linear stage 612. The various encoders include the encoders 513, 523, and 623. The position $\theta1$ of the first rotation stage 512 is defined as the rotation angle of the first rotation stage 512 with reference to a predetermined position. The position $\theta1$ is measured by the encoder 513. The rotation angle of the second rotation stage 522 with reference to a predetermined position is defined as the position $\theta2$ of the second rotation stage 522. The position $\theta2$ is measured by the encoder 523. The movement distance of the linear stage 612 with reference to a predetermined position is defined as a position Y of the linear stage 612. The position Y is measured by the encoder 613.

At S13, the laser control processor 130 performs calibration of the wavelength $\lambda1$. The laser control processor 130 acquires, through the calibration of the wavelength $\lambda1$, data for controlling the position $\theta1$ to adjust the wavelength $\lambda1$. Details of the calibration of the wavelength $\lambda1$ will be described later with reference to FIG. 16.

At S14, the laser control processor 130 performs calibration of the wavelength $\lambda2$. The laser control processor 130 acquires, through the calibration of the wavelength $\lambda2$, data for controlling the position $\theta2$ to adjust the wavelength $\lambda2$. Details of the calibration of the wavelength $\lambda2$ will be described later with reference to FIG. 17.

At S16, the laser control processor 130 performs calibration of the intensity ratio R. The laser control processor 130 acquires, through the calibration of the intensity ratio R, data for controlling the position Y to adjust the intensity ratio R. Details of the calibration of the intensity ratio R will be described later with reference to FIG. 18.

At S18, the laser control processor 130 returns the various actuators to the positions stored at S12.

At S19, the laser control processor 130 opens the shutter 18 and transmits a preparation OK signal to the exposure control processor 210 of the exposure apparatus 200.

At S20, the laser control processor 130 reads parameters stored through various calibrations. The various calibrations include the calibration of the wavelength $\lambda1$, the calibration of the wavelength $\lambda2$, and the calibration of the intensity ratio R. The parameters stored through the various calibrations include parameters of the first relation $\lambda1\theta1$, parameters of the second relation $\lambda2\theta2$, and parameters of a third relation RY. The various calibrations and parameters will be described later with reference to FIGS. 16 to 18.

At S21, the laser control processor 130 performs exposure light outputting in accordance with various signals received from the exposure control processor 210. Details of the exposure light outputting will be described later with reference to FIG. 25.

At S22, the laser control processor 130 determines whether a stop signal has been received from the exposure control processor 210. The stop signal notifies that exposure is not to be performed, for example, when reticles or semiconductor wafers are to be exchanged in the exposure apparatus 200.

When the stop signal has not been received (NO at S22), the laser control processor 130 returns the processing to S21.

When the stop signal has been received (YES at S22), the laser control processor 130 advances the processing to S23.

At S23, the laser control processor 130 transmits a preparation NOK signal to the exposure control processor 210. Thereafter, the laser control processor 130 returns the processing to S11.

2.5.2 Wavelength $\lambda1$ Calibration

FIG. 16 is a flowchart illustrating calibration processing of the wavelength $\lambda1$ in the first embodiment. The processing illustrated in FIG. 16 corresponds to a subroutine of S13 in FIG. 15.

At S131, the laser control processor 130 sets the position Y of the linear stage 612 to a first position Ymin. Accordingly, the parallel plane substrate 61 moves to a position retracted from the optical path of an optical beam as illustrated in FIG. 11. Thus, the proportion of the wavelength component of the wavelength $\lambda1$ in a pulse laser beam becomes larger than the proportion of the wavelength component of the wavelength $\lambda2$.

At S132, the laser control processor 130 sets the position θ1 of the first rotation stage 512 to θ1min. The value θ1min is, for example, the minimum value of θ1 in the movable range of the first rotation stage 512.

At S133, the laser control processor 130 transmits the oscillation trigger signal to the switch 13a of the pulse power module 13 (refer to FIG. 2) so that the laser apparatus 100 performs laser oscillation. The laser control processor 130 outputs the oscillation trigger signal without receiving the trigger signal from the exposure control processor 210.

At S134, the laser control processor 130 measures the wavelength λ1 by using the optical meter 17.

At S135, the laser control processor 130 stores the position θ1 and the wavelength λ1 in association with each other in the memory 132.

At S136, the laser control processor 130 sets the position θ1 to the next position θ1+Δθ1. The value Δθ1 is a movement amount of the position θ1 for the calibration of the wavelength λ1.

At S137, the laser control processor 130 determines whether a value indicating the position θ1 is smaller than θ1max. The value θ1max is, for example, the maximum value of θ1 in the movable range of the first rotation stage 512.

When the value indicating the position θ1 is smaller than θ1max (YES at S137), the laser control processor 130 returns the processing to S133.

When the value indicating the position θ1 is equal to or larger than θ1max (NO at S137), the laser control processor 130 advances the processing to S138.

At S138, the laser control processor 130 calculates an expression indicating the first relation λ1θ1 between the position θ1 of the first rotation stage 512 measured by the encoder 513 and the wavelength λ1 measured by using the optical meter 17.

At S139, the laser control processor 130 stores the parameters of the first relation λ1θ1 in the memory 132. The parameters of the first relation λ1θ1 are, for example, coefficients of the expression indicating the first relation λ1θ1.

After S139, the laser control processor 130 ends the processing of the present flowchart and returns to the processing illustrated in FIG. 15.

Figure 22:
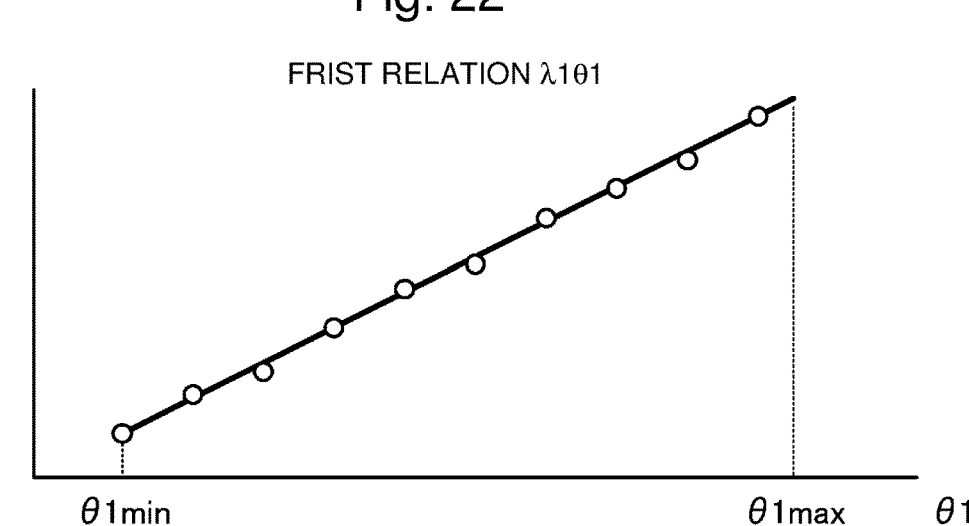
FIG. 22 illustrates an exemplary first relation acquired through calibration of the wavelength λ1.

FIG. 22 illustrates an example of the first relation λ1θ1 acquired through the calibration of the wavelength λ1. As the position θ1 of the first rotation stage 512 is changed from θ1min to θ1max, the posture of the grating 51 changes and the wavelength λ1 changes. The laser control processor 130 may produce, at S138 in FIG. 16, an approximate expression below indicating the relation between the position θ1 of the first rotation stage 512 measured by the encoder 513 and the wavelength λ1 measured by using the optical meter 17.

$$\lambda 1 = a 1 \cdot \theta 1 + b 1$$

Parameters such as the coefficients a1 and b1 included in the approximate expression may be stored in the memory 132 at S139 in FIG. 16.

2.5.3 Wavelength λ2 Calibration

FIG. 17 is a flowchart illustrating calibration processing of the wavelength λ2 in the first embodiment. The processing illustrated in FIG. 17 corresponds to a subroutine of S14 in FIG. 15.

At S141, the laser control processor 130 sets the position Y of the linear stage 612 to a second position Ymax. Accordingly, the parallel plane substrate 61 moves to a position that the entire optical beam passes as illustrated in FIG. 12. Thus, the proportion of the wavelength component of the wavelength λ2 in a pulse laser beam becomes larger than the proportion of the wavelength component of the wavelength Xl.

Processing at S142 to S149 is the same as corresponding processing in FIG. 16 with replacement of the wavelength λ1 and the position θ1 with the wavelength λ2 and the position θ2, respectively, and with any other accompanying replacement, and thus detailed description thereof is omitted.

Figure 23:
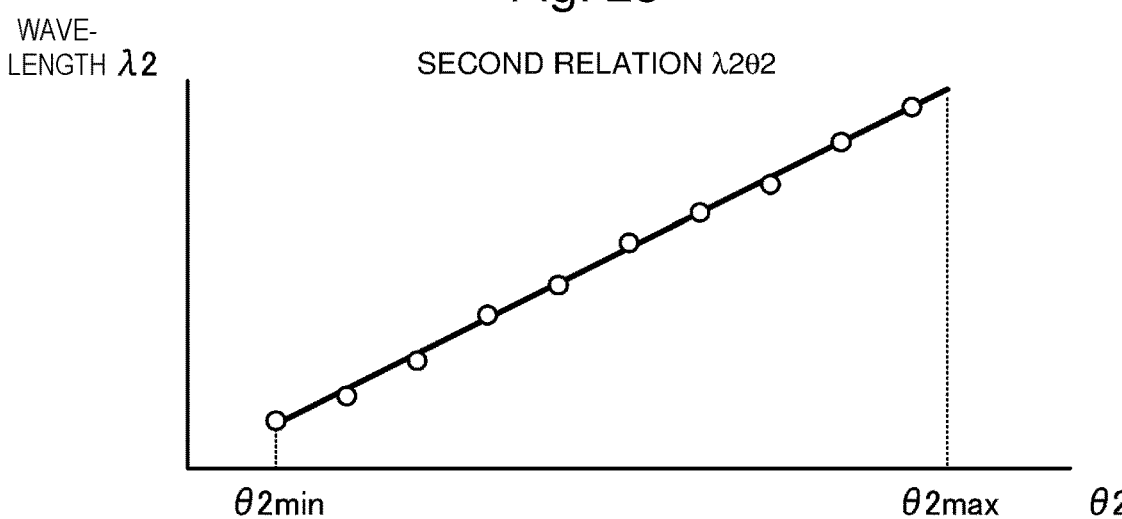
FIG. 23 illustrates an exemplary second relation acquired through calibration of the wavelength λ2.

FIG. 23 illustrates an example of the second relation λ2θ2 acquired through the calibration of the wavelength λ2. As the position θ2 of the second rotation stage 522 is changed from θ2min to θ2max, the posture of the grating 52 changes and the wavelength λ2 changes. The laser control processor 130 may produce, at S148 in FIG. 17, an approximate expression below indicating the relation between the position θ2 of the second rotation stage 522 measured by the encoder 523 and the wavelength λ2 measured by using the optical meter 17.

$$\lambda 2 = a 2 \cdot \theta 2 + b 2$$

Parameters such as the coefficients a2 and b2 included in the approximate expression may be stored in the memory 132 at S149 in FIG. 17.

2.5.4 Intensity Ratio R Calibration

FIG. 18 is a flowchart illustrating calibration processing of the intensity ratio R in the first embodiment. The processing illustrated in FIG. 18 corresponds to a subroutine of S16 in FIG. 15.

At S160, the laser control processor 130 sets the position θ1 of the first rotation stage 512 so that the wavelength λ1 becomes a first measurement wavelength. For example, a value close to the wavelength of a pulse laser beam used as exposure light is selected as the first measurement wavelength. The position θ1 may be set by using the first relation λ1θ1 acquired through the calibration of the wavelength λ1 (refer to FIG. 16). Alternatively, the position Y of the linear stage 612 may be set to the first position Ymin, laser oscillation may be actually performed, and the position θ1 may be set so that the wavelength λ1 measured by using the optical meter 17 becomes the first measurement wavelength.

At S161, the laser control processor 130 sets the position θ2 of the second rotation stage 522 so that the wavelength λ2 becomes a second measurement wavelength λ1+FSR/2. The second measurement wavelength is a value obtained by adding half of the free-spectral range to the first measurement wavelength. In other words, the wavelengths λ1 and λ2 are set so that the wavelength difference between the wavelengths λ1 and λ2 becomes equal to half of the free-spectral range. When the free-spectral range of the spectroscopic sensor 17g illustrated in FIG. 6 is larger than the free-spectral range of the spectroscopic sensor 17f, the wavelength difference between the wavelengths λ1 and λ2 may be set to half of the free-spectral range of the spectroscopic sensor 17f.

Figure 19:
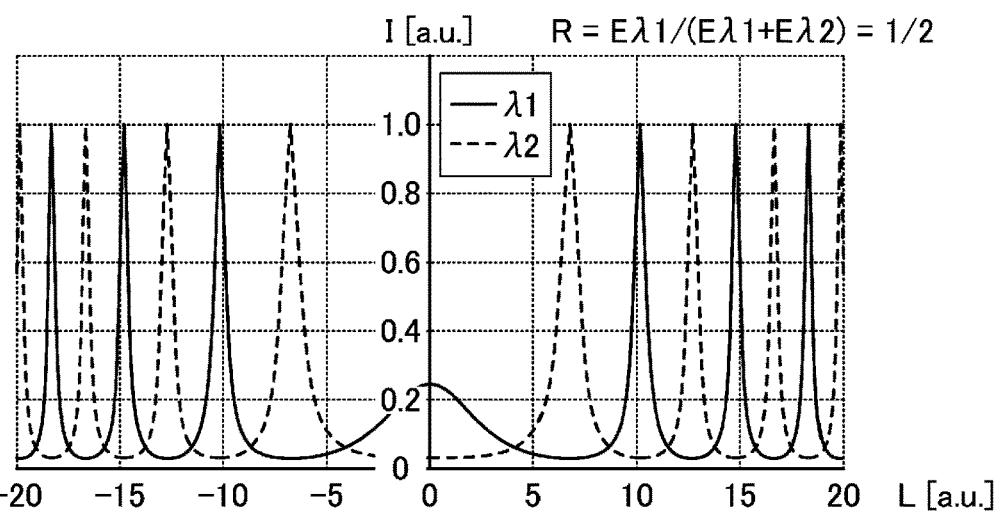
FIG. 19 is a graph illustrating an exemplary result of interference fringe measurement when the pulse laser beams of the wavelengths λ1 and λ2 having a wavelength difference equal to half of a free-spectral range are separately incident on the spectroscopic sensor.

FIG. 19 is a graph illustrating an exemplary result of interference fringe measurement when pulse laser beams of the wavelengths λ1 and λ2 having a wavelength difference equal to half of the free-spectral range are separately incident on the spectroscopic sensor 17f. When the wavelength difference is set to half of the free-spectral range, peaks of the interference fringe of the wavelength λ1 and peaks of the interference fringe of the wavelength λ2 alternately appear at a large interval.

Figure 20:
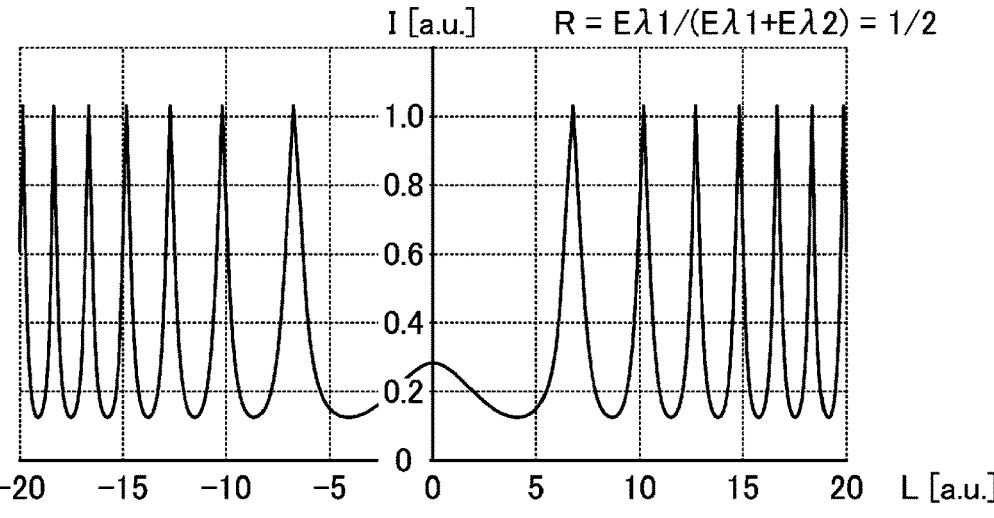
FIG. 20 is a graph illustrating an exemplary result of interference fringe measurement when the pulse laser beams of the wavelengths λ1 and λ2 having a wavelength difference equal to half of the free-spectral range are simultaneously incident on the spectroscopic sensor, and illustrating an exemplary result of interference fringe measurement when an intensity ratio defined as Eλ1/(Eλ1+Eλ2) is 1/2.
Figure 21:
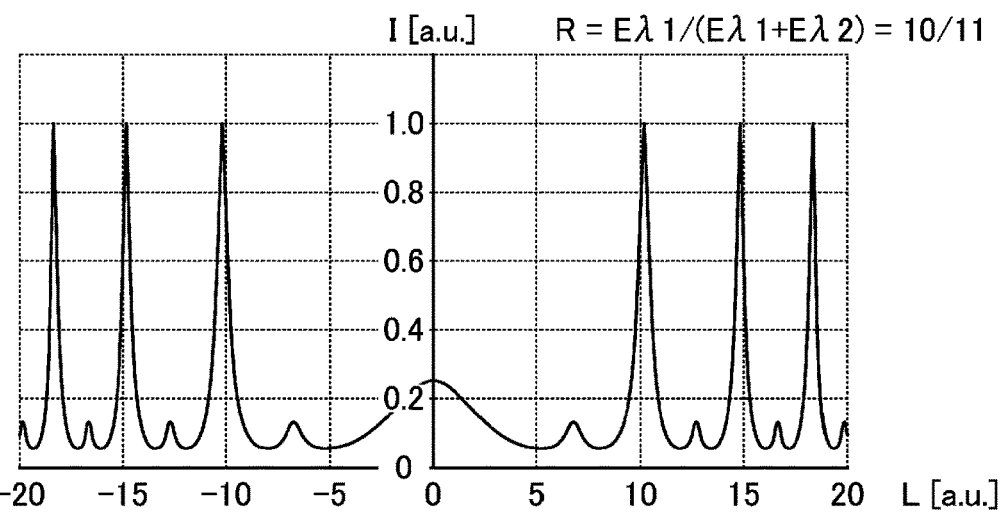
FIG. 21 is a graph illustrating an exemplary result of interference fringe measurement when pulse laser beams of the wavelengths λ1 and λ2 having a wavelength difference equal to half of the free-spectral range are simultaneously incident on the spectroscopic sensor, and illustrating an exemplary result of interference fringe measurement when the intensity ratio defined as Eλ1/(Eλ1+Eλ2) is 10/11.

FIGS. 20 and 21 are graphs illustrating an exemplary result of interference fringe measurement when pulse laser beams of the wavelengths λ1 and λ2 having a wavelength difference equal to half of the free-spectral range are simultaneously incident on the spectroscopic sensor 17f. The waveform illustrated in FIG. 20 is substantially equivalent to a synthesis waveform of the waveform of the interference fringe of the wavelength λ1 and the waveform of the interference fringe of the wavelength λ2 in FIG. 19.

At S162 in FIG. 18, the laser control processor 130 sets the position Y of the linear stage 612 to the first position Ymin.

At S163, the laser control processor 130 transmits the oscillation trigger signal to the switch 13a of the pulse power module 13 so that the laser apparatus 100 performs laser oscillation. This processing is the same as the processing at S133 (refer to FIG. 16).

At S164, the laser control processor 130 measures the intensity ratio R by using the optical meter 17.

FIG. 20 illustrates an exemplary result of interference fringe measurement when the intensity ratio R defined as Eλ1/(Eλ1+Eλ2) is 1/2.

FIG. 21 illustrates an exemplary result of interference fringe measurement when the intensity ratio R defined as Eλ1/(Eλ1+Eλ2) is 10/11.

As understood from FIGS. 20 and 21, when the wavelength difference between the wavelengths λ1 and λ2 is close to half of the free-spectral range, peaks of the interference fringe of the wavelength λ1 and peaks of the interference fringe of the wavelength λ2 can be distinguished and specified. When the first measurement wavelength and the second measurement wavelength are known, the interference fringes are potentially more easily distinguished. Once the interference fringes are distinguished, the intensity ratio R can be calculated from the light intensity I of each interference fringe.

At S165 in FIG. 18, the laser control processor 130 stores the position Y and the intensity ratio R in association with each other in the memory 132.

At S166, the laser control processor 130 sets the position Y to next position Y+ΔY. The value ΔY is a movement amount of the position Y for the calibration of the intensity ratio R.

At S167, the laser control processor 130 determines whether a value indicating the position Y is smaller than Ymax.

When the value indicating the position Y is smaller than Ymax (YES at S167), the laser control processor 130 returns the processing to S163.

When the value indicating the position Y is equal to or larger than Ymax (NO at S167), the laser control processor 130 advances the processing to S168.

At S168, the laser control processor 130 calculates an expression indicating the third relation RY between the position Y of the linear stage 612 measured by the encoder 613 and the intensity ratio R measured by using the optical meter 17.

At S169, the laser control processor 130 stores the parameters of the third relation RY in the memory 132. The parameters of the third relation RY are, for example, coefficients of the expression indicating the third relation RY.

After S169, the laser control processor 130 ends the processing of the present flowchart and returns to the processing illustrated in FIG. 15.

Figure 24:
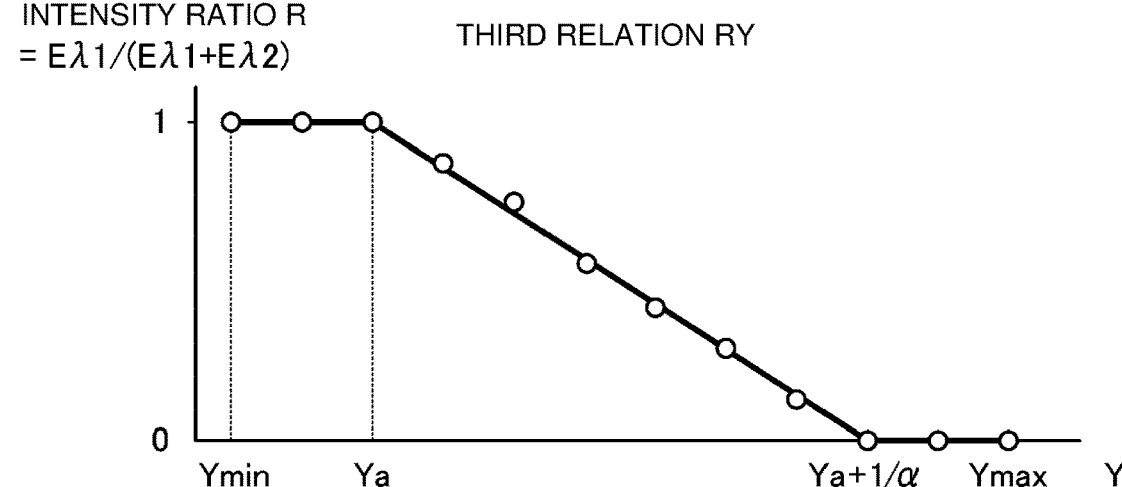
FIG. 24 illustrates an exemplary third relation acquired through calibration of the intensity ratio R.

FIG. 24 illustrates an example of the third relation RY acquired through the calibration of the intensity ratio R. As the position Y of the linear stage 612 is changed from the first position Ymin to the second position Ymax, the position of the parallel plane substrate 61 changes and the intensity ratio R changes. However, the intensity ratio R is one between Ymin and Ya. Specifically, in the calibration of the wavelength λ1 (refer to FIG. 16), sufficient clearance is ensured between the parallel plane substrate 61 and an optical beam so that the optical beam is not incident on the parallel plane substrate 61. The intensity ratio R is zero between Ya+1/α and Ymax. Specifically, in the calibration of the wavelength λ2 (refer to FIG. 17), the end face 616 of the parallel plane substrate 61 is disposed below the lower end position of an optical beam so that the entire optical beam is incident on the parallel plane substrate 61.

The third relation RY is expressed by, for example, an expression as described below.

$$R=1-\alpha \times (Y-Ya)$$

However, R may be one when Y is equal to or smaller than Ya, and R may be zero when Y is equal to or larger than Ya+1/α.

The laser control processor 130 may produce the expression indicating the third relation RY at S168 in FIG. 18.

Parameters such as the coefficients a and Ya included in the expression may be stored in the memory 132 at S169 in FIG. 18.

2.5.5 Exposure Light Outputting

FIG. 25 is a flowchart illustrating outputting processing of exposure light in the first embodiment. The processing illustrated in FIG. 25 corresponds to a subroutine of S21 in FIG. 15.

At S212, the laser control processor 130 reads the target wavelengths λ1t and λ2t and the target intensity ratio Rt. The target wavelengths λ1t and λ2t and the target intensity ratio Rt may be received from the exposure control processor 210.

Alternatively, the laser control processor 130 may receive a target average wavelength (λ1t+λ2t)/2 and a target wavelength difference λ1t–λ2t from the exposure control processor 210 in place of the target wavelengths λ1t and λ2t. Alternatively, the laser control processor 130 may receive the target wavelength λ1t and the target wavelength difference λ1t–λ2t from the exposure control processor 210. The laser control processor 130 may calculate the target wavelengths λ1t and λ2t based on these values received from the exposure control processor 210 and may read results of the calculation.

The laser control processor 130 may receive target pulse energies Eλ1t and Eλ2t of the respective wavelength components from the exposure control processor 210 in place of the target intensity ratio Rt. The laser control processor 130 may calculate the target intensity ratio Rt based on these values received from the exposure control processor 210 and may read a result of the calculation.

At S213, the laser control processor 130 calculates a target position θ1t of the first rotation stage 512, a target position θ2t of the second rotation stage 522, and a target position Yt of the linear stage 612.

The target position θ1t is calculated based on the first relation λ1θ1 acquired through the calibration of the wavelength λ1 and the target wavelength λ1t received from the exposure control processor 210.

The target position $\theta2t$ is calculated based on the second relation $\lambda2\theta2$ acquired through the calibration of the wavelength $\lambda2$ and the target wavelength $\lambda2t$ received from the exposure control processor 210.

The target position Yt is calculated based on the third relation RY acquired through the calibration of the intensity ratio R and the target intensity ratio Rt received from the exposure control processor 210.

At S214, the laser control processor 130 sets the positions $\theta1$, $\theta2$, and Y of the various actuators to the respective target positions $\theta1t$, $\theta2t$, and Yt. Then, the laser control processor 130 controls the various actuators as described below.

The laser control processor 130 controls the first rotation stage 512 so that the position $\theta1$ of the first rotation stage 512 measured by the encoder 513 approaches the target position $\theta1t$.

The laser control processor 130 controls the second rotation stage 522 so that the position $\theta2$ of the second rotation stage 522 measured by the encoder 523 approaches the target position $\theta2t$.

The laser control processor 130 controls the linear stage 612 so that the position Y of the linear stage 612 measured by the encoder 613 approaches the target position Yt.

At S215, the laser control processor 130 determines whether the trigger signal has been received from the exposure control processor 210.

When the trigger signal has not been received (NO at S215), the laser control processor 130 waits until the trigger signal is received.

When the trigger signal has been received (YES at S215), the laser control processor 130 advances the processing to S216.

At S216, the laser control processor 130 transmits the oscillation trigger signal to the switch 13a of the pulse power module 13 and controls the laser apparatus 100 so that laser oscillation is performed.

After S216, the laser control processor 130 ends the processing of the present flowchart and returns to the processing illustrated in FIG. 15.

2.6 Effect (1) According to the first embodiment, the laser apparatus 100 includes the gratings 51 and 52, the first rotation stage 512 configured to change the wavelength $\lambda1$ of light included in a pulse laser beam by changing the posture of the grating 51, the second rotation stage 522 configured to change the wavelength $\lambda2$ of light included in the pulse laser beam by changing the posture of the grating 52, the encoder 513 configured to measure the position $\theta1$ of the first rotation stage 512, the encoder 523 configured to measure the position $\theta2$ of the second rotation stage 522, and the laser control processor 130.

The laser control processor 130 reads the first relation $\lambda1\theta1$ between the position $\theta1$ of the first rotation stage 512 and the wavelength $\lambda1$ and the second relation $\lambda2\theta2$ between the position $\theta2$ of the second rotation stage 522 and the wavelength $\lambda2$ (S20).

The laser control processor 130 performs control of the first rotation stage 512 based on the first relation $\lambda1\theta1$ and the position $\theta1$ of the first rotation stage 512 measured by the encoder 513 and control of the second rotation stage 522 based on the second relation $\lambda2\theta2$ and the position $\theta2$ of the second rotation stage 522 measured by the encoder 523 (S213 and S214).

Accordingly, the first rotation stage 512 is controlled based on the first relation $\lambda1\theta1$ and the output from the encoder 513, and the second rotation stage 522 is controlled based on the second relation $\lambda2\theta2$ and the output from the encoder 523. Thus, the wavelengths $\lambda1$ and $\lambda2$ can be adjusted without measurement thereof when exposure light is to be output. Wavelength calculation is typically performed by providing interference fringe data obtained by a spectroscopic sensor with deconvolution processing using a device function of the optical meter 17. Normally, a time longer than the shortest oscillation period of the laser apparatus 100 is needed for wavelength calculation. Thus, it has been difficult to perform outputting while controlling two optional wavelengths for each pulse. However, according to the first embodiment, since the wavelengths $\lambda1$ and $\lambda2$ are not measured when exposure light is to be output, deconvolution processing along with wavelength calculation at exposure light outputting is unnecessary. Thus, it is possible to perform outputting while controlling two optional wavelengths for each pulse.

(2) According to the first embodiment, the laser apparatus 100 includes the optical meter 17 configured to measure the wavelengths $\lambda1$ and $\lambda2$.

The laser control processor 130 measures the wavelength $\lambda1$ by using the optical meter 17 (S134) and performs processing of storing, as the first relation $\lambda1\theta1$ in the memory 132, the relation between the position $\theta1$ of the first rotation stage 512 measured by the encoder 513 and the wavelength $\lambda1$ (S138 and S139).

The laser control processor 130 measures the wavelength $\lambda2$ by using the optical meter 17 (S144) and performs processing of storing, as the second relation $\lambda2\theta2$ in the memory 132, the relation between the position $\theta2$ of the second rotation stage 522 measured by the encoder 523 and the wavelength $\lambda2$ (S148 and S149).

Accordingly, the first relation $\lambda1\theta1$ between the wavelength $\lambda1$ measured by using the optical meter 17 and the position $\theta1$ of the first rotation stage 512 measured by the encoder 513 is stored. In addition, the second relation $\lambda2\theta2$ between the wavelength $\lambda2$ measured by using the optical meter 17 and the position $\theta2$ of the second rotation stage 522 measured by the encoder 523 is stored. Since the first relation $\lambda1\theta1$ and the second relation $\lambda2\theta2$ are measured and stored in advance, it is possible to accurately perform control of the wavelengths $\lambda1$ and $\lambda2$ using the encoders 513 and 523.

(3) According to the first embodiment, the laser apparatus 100 includes the linear stage 612 configured to change the intensity ratio R between the wavelengths $\lambda1$ and $\lambda2$.

In a state in which the proportion of the wavelength component of the wavelength $\lambda1$ is set to be larger than the proportion of the wavelength component of the wavelength $\lambda2$ by the linear stage 612 (S131), the laser control processor 130 measures the wavelength $\lambda1$ by using the optical meter 17 (S134). In a state in which the proportion of the wavelength component of the wavelength $\lambda2$ is set to be larger than the proportion of the wavelength component of the wavelength $\lambda1$ by the linear stage 612 (S141), the laser control processor 130 measures the wavelength $\lambda2$ by using the optical meter 17 (S144).

Accordingly, since the intensity ratio R between the wavelengths $\lambda1$ and $\lambda2$ is changed and the wavelengths $\lambda1$ and $\lambda2$ are individually measured, it is possible to accurately measure these wavelengths.

(4) According to the first embodiment, the laser apparatus 100 includes the linear stage 612 configured to change the intensity ratio R between the wavelengths $\lambda1$ and $\lambda2$ and the encoder 613 configured to measure the position Y of the linear stage 612.

The laser control processor 130 reads the third relation RY between the position Y of the linear stage 612 and the intensity ratio R (S20) and performs control of the linear stage 612 based on the third relation RY and the position Y of the linear stage 612 measured by the encoder 613 (S213 and S214).

Accordingly, the linear stage 612 is controlled based on the third relation RY and the output from the encoder 613. Thus, it is possible to adjust the intensity ratio R without measuring the intensity ratio R between the wavelengths λ1 and λ2 when exposure light is to be output.

(5) According to the first embodiment, the laser apparatus 100 includes the optical meter 17 configured to measure the intensity ratio R between the wavelengths λ1 and λ2. The laser control processor 130 measures the intensity ratio R by using the optical meter 17 (S164) and stores, as the third relation RY in the memory 132, the relation between the position Y of the linear stage 612 measured by the encoder 613 and the intensity ratio R (S168 and S169).

Accordingly, the third relation RY between the intensity ratio R measured by using the optical meter 17 and the position Y of the linear stage 612 measured by the encoder 613 is stored. Since the third relation RY is measured and stored in advance, it is possible to accurately perform control of the intensity ratio R using the encoder 613.

(6) According to the first embodiment, the laser control processor 130 performs control of the first rotation stage 512 and the second rotation stage 522 so that the wavelength difference between the wavelengths λ1 and λ2 approaches half of the free-spectral range of the optical meter 17 (S160 and S161), and thereafter measures the intensity ratio R by using the optical meter 17 (S164).

Accordingly, since adjustment is performed so that the wavelength difference between the wavelengths λ1 and λ2 approaches half of the free-spectral range, it is possible to measure the intensity ratio R of the wavelengths λ1 and λ2 even when light of the wavelength λ1 and light of the wavelength of λ2 are simultaneously output.

The other features of the first embodiment are the same as those of the comparative example.

3. LASER APPARATUS CONFIGURED TO SELECT THIRD RELATION RY IN ACCORDANCE WITH REPETITION FREQUENCY F AND CHARGING VOLTAGE V

3.1 Main Flow

FIG. 26 is a flowchart illustrating operation of the laser control processor 130 in a second embodiment. The configuration of the laser apparatus 100 according to the second embodiment is the same as in the first embodiment. The second embodiment is different from the first embodiment in that calibration of the third relation RY(f, V) (S15b) is performed in place of the calibration of the intensity ratio R (S16). In the second embodiment, exposure light outputting (S21b) is performed in place of the exposure light outputting (S21).

3.2 Third Relation RY(f, V) Calibration

Figures 27, 28:
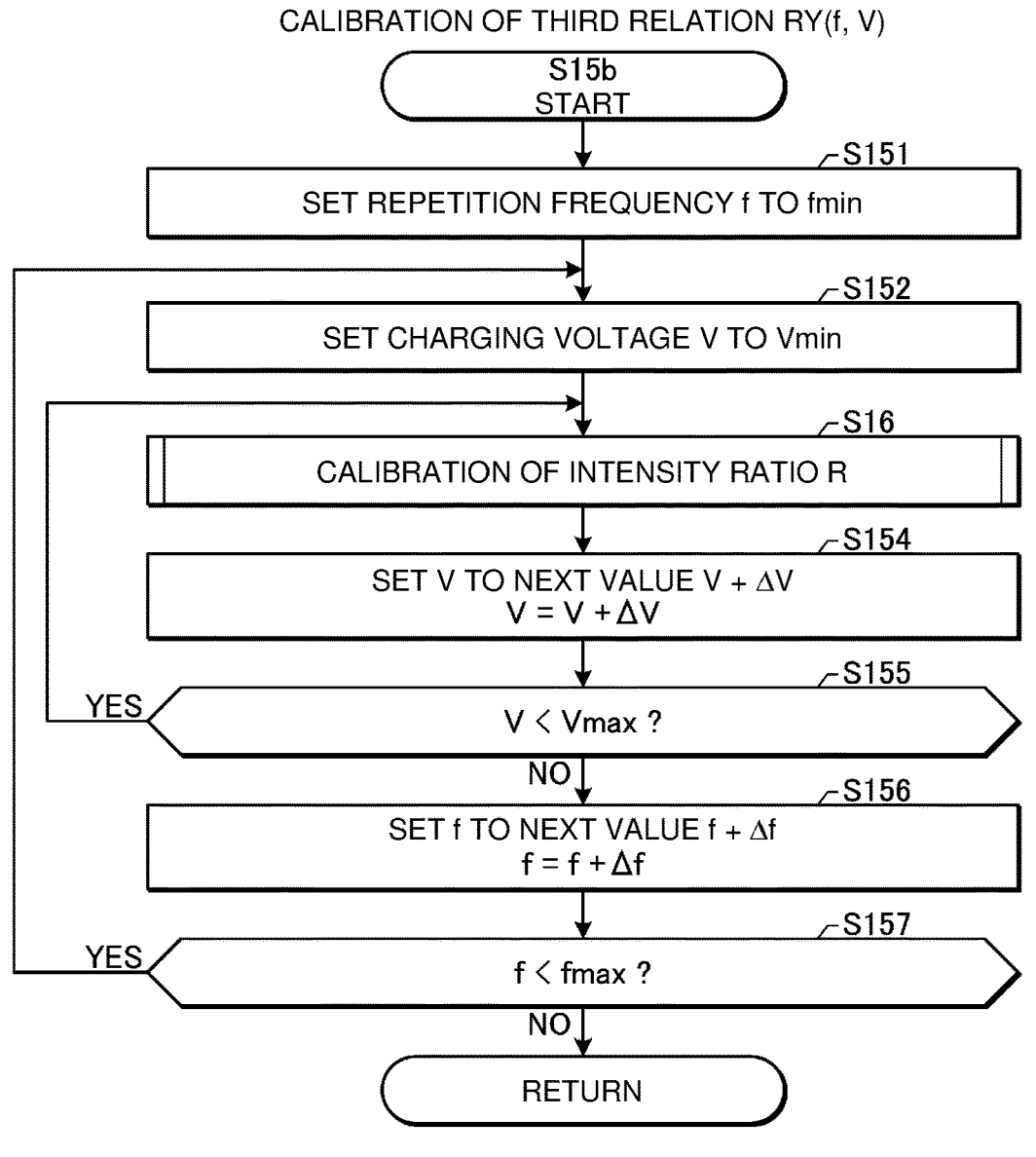
FIG. 27 is a flowchart illustrating calibration processing of a third relation RY(f, V) in the second embodiment.
FIG. 28 illustrates exemplary data stored in a memory by calibration of the third relation RY(f, V).

FIG. 27 is a flowchart illustrating calibration processing of the third relation RY(f, V) in the second embodiment. The processing illustrated in FIG. 27 corresponds to a subroutine of S15b in FIG. 26.

At S151, the laser control processor 130 sets a repetition frequency f of a pulse laser beam to fmin. The value fmin is the minimum value of the repetition frequency f that can be requested by the exposure control processor 210.

At S152, the laser control processor 130 sets the charging voltage V of the charger 12 (refer to FIG. 2) to Vmin. The value Vmin is the minimum value of the charging voltage V in accordance with the range of pulse energy that can be requested by the exposure control processor 210.

At S16 following S152, the laser control processor 130 performs calibration of the intensity ratio R. The processing at S16 is the same as the calibration of the intensity ratio R in the first embodiment. However, the calibration of the intensity ratio R in the second embodiment is different from the calibration of the intensity ratio R in the first embodiment in that the calibration of the intensity ratio R in the second embodiment is performed a larger number of times in accordance with loop processing of the present flowchart than the calibration of the wavelength λ1 and the calibration of the wavelength λ2.

At S154 following S16, the laser control processor 130 sets the charging voltage V to the next value V+ΔV. The value ΔV is a change amount of the charging voltage V for the calibration of the third relation RY(f, V).

At S155, the laser control processor 130 determines whether the charging voltage V is lower than Vmax.

When the charging voltage V is lower than Vmax (YES at S155), the laser control processor 130 returns the processing to S16.

When the charging voltage V is equal to or higher than Vmax (NO at S155), the laser control processor 130 advances the processing to S156.

At S156, the laser control processor 130 sets the repetition frequency f to the next value f+Δf. The value Δf is a change amount of the repetition frequency f for the calibration of the third relation RY(f, V).

At S157, the laser control processor 130 determines whether the repetition frequency f is lower than fmax.

When the repetition frequency f is lower than fmax (YES at S157), the laser control processor 130 returns the processing to S152.

When the repetition frequency f is equal to or higher than fmax (NO at S157), the laser control processor 130 ends the processing of the present flowchart and returns to the processing illustrated in FIG. 26.

FIG. 28 illustrates exemplary data stored in the memory 132 through the calibration of the third relation RY(f, V). In the calibration of the third relation RY(f, V), the calibration of the intensity ratio R (S16) is performed a plurality of times in accordance with the repetition frequency f and the charging voltage V. As a result, a plurality of third relations RY(f, V) in accordance with the repetition frequency f and the charging voltage V are stored in the memory 132. The memory 132 may store the third relations RY(f, V) in a table format. This table is also referred to as a "third relation RY(f, V) table" in description below.

In FIG. 28, a third relation RY(fi, Vj) is the relation between the intensity ratio R and the position Y of the linear stage 612, which is obtained by setting an i-th repetition frequency fi and a j-th charging voltage Vj and performing calibration of the intensity ratio R. The number of third relations RY(fi, Vj) is equal to a number obtained by multiplying the maximum value of i and the maximum value of j.

3.3 Exposure Light Outputting

FIG. 29 is a flowchart illustrating outputting processing of exposure light in the second embodiment. The processing illustrated in FIG. 29 corresponds to a subroutine of S21b in FIG. 26.

At S210b, the laser control processor 130 sets the repetition frequency f and the charging voltage V based on a signal received from the exposure control processor 210.

At S211b, the laser control processor 130 searches the third relation RY(f, V) table with the repetition frequency f and the charging voltage V thus set. The laser control processor 130 specifies the third relation RY(f, V) corresponding to the repetition frequency f and the charging voltage V thus set.

For example, when the repetition frequency f set at S210b is equal to or higher than f1 and lower than f2 and the set charging voltage V is equal to or higher than V1 and lower than V2, a third relation RY(f1, V1) is specified in the third relation RY(f, V) table in FIG. 28.

Processing at S212 or later is the same as corresponding processing in the first embodiment. Specifically, the first rotation stage 512, the second rotation stage 522, and the linear stage 612 are controlled based on the third relation RY(f1, V1) specified at S211b so that the wavelengths λ1 and λ2 and the intensity ratio R approach respective target values. Thereafter, exposure light is output.

3.4 Effect (7) According to the second embodiment, the third relation RY(f, V) is stored in the memory 132 in association with the repetition frequency f of a pulse laser beam. The laser control processor 130 performs control of the linear stage 612 based on the third relation RY(f, V) associated with the repetition frequency f of the pulse laser beam and based on the position Y of the linear stage 612 measured by the encoder 613.

In the first and second embodiments, since an optical beam is spatially divided into the first part B1 and the second part B2 and the divided parts are separately subjected to wavelength control, gas density is preferably uniform on the optical path of the optical beam. However, when the repetition frequency f changes, fluctuation occurs to gas density on the optical path of the optical beam and affects the intensity ratio R in some cases. According to the second embodiment, since an appropriate third relation RY(f, V) is selected in accordance with the repetition frequency f, the accuracy of control of the intensity ratio R can be improved.

(8) According to the second embodiment, the laser apparatus 100 includes the laser chamber 10, the pair of electrodes 11a and 11b disposed in the laser chamber 10, and the charger 12 configured to store electric energy for applying voltage to the electrodes 11a and 11b.

The third relation RY(f, V) is stored in the memory 132 in association with the charging voltage V of the charger 12. The laser control processor 130 performs control of the linear stage 612 based on the third relation RY(f, V) associated with the charging voltage V of the charger 12 and based on the position Y of the linear stage 612 measured by the encoder 613.

In the first and second embodiments, when the charging voltage V changes, fluctuation occurs to gas density on the optical path of an optical beam and affects the intensity ratio R in some cases. According to the second embodiment, since an appropriate third relation RY(f, V) is selected in accordance with the charging voltage V, the accuracy of control of the intensity ratio R can be improved.

3.5 Other Exemplary Configuration

The second embodiment is described above on the case in which the repetition frequency f and the charging voltage V in addition to the third relation RY between the position Y of the linear stage 612 and the intensity ratio R are stored in the third relation RY(f, V) table, but the present disclosure is not limited thereto. The relation among the position Y of the linear stage 612, the intensity ratio R, the repetition frequency f, and the charging voltage V may be expressed by, for example, an expression as described below.

$$R = a1 \cdot Y + a2 \cdot Y^2 + b1 \cdot f + b2 \cdot f^2 + c1 \cdot V + c1 \cdot V^2 + d$$

The other features of the second embodiment are the same as those of the first embodiment.

4. LASER APPARATUS CONFIGURED TO ADJUST INTENSITY RATIO R WITHOUT USING THIRD RELATION RY

4.1 Main Flow

FIG. 30 is a flowchart illustrating operation of the laser control processor 130 in a third embodiment. The configuration of the laser apparatus 100 according to the third embodiment is the same as in the first embodiment. The third embodiment is different from the first embodiment in that setting of the position Y of the linear stage 612 (S17c) is performed in place of the calibration of the intensity ratio R (S16). In the third embodiment, exposure light outputting (S21c) is performed in place of the exposure light outputting (S21). The processing (S12) of storing the positions of the various actuators and the processing (S18) of returning the various actuators to the stored positions in the first embodiment are omitted in the third embodiment.

4.2 Setting of Position Y of Linear Stage 612

Figure 31:
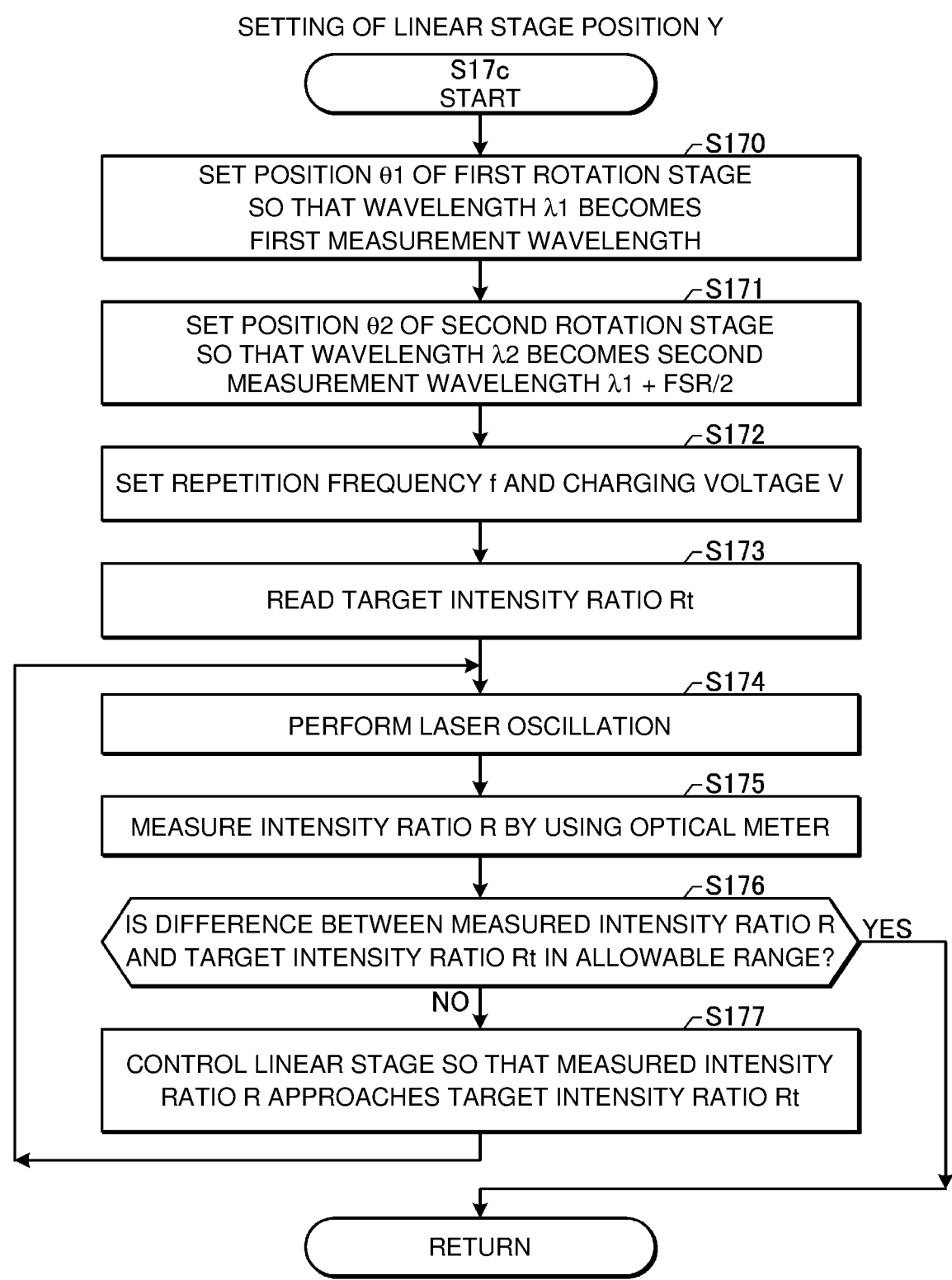
FIG. 31 is a flowchart illustrating setting processing of a position Y of a linear stage in the third embodiment.

FIG. 31 is a flowchart illustrating setting processing of the position Y of the linear stage 612 in the third embodiment. The processing illustrated in FIG. 31 corresponds to a subroutine of S17c in FIG. 30.

Processing at S170 and S171 is the same as the processing at S160 and S161 in FIG. 18. Specifically, the laser control processor 130 controls the first rotation stage 512 and the second rotation stage 522 so that the wavelength difference between the wavelengths λ1 and λ2 becomes equal to half of the free-spectral range of the optical meter 17.

At S172, the laser control processor 130 sets the repetition frequency f and the charging voltage V based on a signal received from the exposure control processor 210. Since the position Y of the linear stage 612 is set after the repetition frequency f and the charging voltage V are set, the intensity ratio R can be accurately adjusted.

At S173, the laser control processor 130 reads the target intensity ratio Rt. The target intensity ratio Rt may be received from the exposure control processor 210.

At S174, the laser control processor 130 transmits the oscillation trigger signal to the switch 13a of the pulse power module 13 (refer to FIG. 2) so that the laser apparatus 100 performs laser oscillation. This processing is the same as the processing at S133 (refer to FIG. 16).

At S175, the laser control processor 130 measures the intensity ratio R by using the optical meter 17.

At S176, the laser control processor 130 determines whether the difference between the intensity ratio R and the target intensity ratio Rt is in an allowable range.

When the difference between the intensity ratio R and the target intensity ratio Rt is in the allowable range (YES at S176), the laser control processor 130 ends the processing of the present flowchart and returns to the processing illustrated in FIG. 30.

When the difference between the intensity ratio R and the target intensity ratio Rt is not in the allowable range (NO at S176), the laser control processor 130 advances the processing to S177.

At S177, the laser control processor 130 controls the linear stage 612 so that the measured intensity ratio R approaches the target intensity ratio Rt.

After S177, the laser control processor 130 returns the processing to S174.

4.3 Exposure Light Outputting

FIG. 32 is a flowchart illustrating outputting processing of exposure light in the third embodiment. The processing illustrated in FIG. 32 corresponds to a subroutine of S21*c* in FIG. 30.

The processing illustrated in FIG. 32 is different from the processing of the first embodiment illustrated in FIG. 25 in that the processing illustrated in FIG. 32 does not include control of the linear stage 612 based on the target intensity ratio Rt.

The other features of the processing illustrated in FIG. 32 are the same as those of the processing illustrated in FIG. 25. Specifically, the target position θ1*t* of the first rotation stage 512 and the target position θ2*t* of the second rotation stage 522 are calculated based on the first relation λ1θ1 and the second relation λ2θ2 (S213*c*). In addition, the first rotation stage 512 and the second rotation stage 522 are controlled so that the position θ1 of the first rotation stage 512 measured by the encoder 513 and the position θ2 of the second rotation stage 522 measured by the encoder 523 approach the target positions θ1*t* and θ2*t*, respectively (S214*c*). Thereafter, exposure light is output.

4.4 Effect (9) According to the third embodiment, the laser apparatus 100 includes the linear stage 612 configured to change the intensity ratio R between the wavelengths λ1 and λ2 and the optical meter 17 configured to measure the intensity ratio R between the wavelengths λ1 and λ2.

The laser control processor 130 reads the target intensity ratio Rt (S173) and performs control of the linear stage 612 so that the intensity ratio R measured by using the optical meter 17 approaches the target intensity ratio Rt (S177). Thereafter, the laser control processor 130 performs control of the first rotation stage 512 based on the first relation λ1θ1 and the position θ1 of the first rotation stage 512 measured by the encoder 513 and control of the second rotation stage 522 based on the second relation λ2θ2 and the position θ2 of the second rotation stage 522 measured by the encoder 523 (S214*c*).

Accordingly, after controlling the linear stage 612 based on a measurement result of the intensity ratio R, the laser control processor 130 controls the first rotation stage 512 and the second rotation stage 522 based on the first relation λ1θ1, the second relation λ2θ2, and results of measurement by the encoders 513 and 523. Thus, the intensity ratio R can be adjusted without measurement of the third relation RY in advance, and the wavelengths λ1 and λ2 can be adjusted based on the first relation λ1θ1 and the second relation λ2θ2 when exposure light is to be output.

(10) According to the third embodiment, the laser control processor 130 performs control of the first rotation stage 512 and the second rotation stage 522 so that the wavelength difference between the wavelengths λ1 and λ2 approaches half of the free-spectral range of the optical meter 17 (S170 and S171). Thereafter, the laser control processor 130 performs control of the linear stage 612 so that the intensity ratio R measured by using the optical meter 17 approaches the target intensity ratio Rt (S175 and S177).

Accordingly, since adjustment is performed so that the wavelength difference between the wavelengths λ1 and λ2 approaches half of the free-spectral range, it is possible to simultaneously output light of the wavelength λ1 and light of the wavelength λ2, measure the intensity ratio R thereof, and control the linear stage 612. Thereafter, when exposure light is to be output, the wavelengths λ1 and λ2 can be adjusted to the target wavelengths λ1*t* and λ2*t*, respectively, by using the first relation λ1θ1 and the second relation λ2θ2.

The other features of the third embodiment are the same as those of the first embodiment.

5. LINE NARROWING DEVICE 14*D* IN WHICH A PLURALITY OF PRISMS 43 AND 44 ARE DISPOSED IN XZ PLANE

5.1 Configuration

Figure 33:
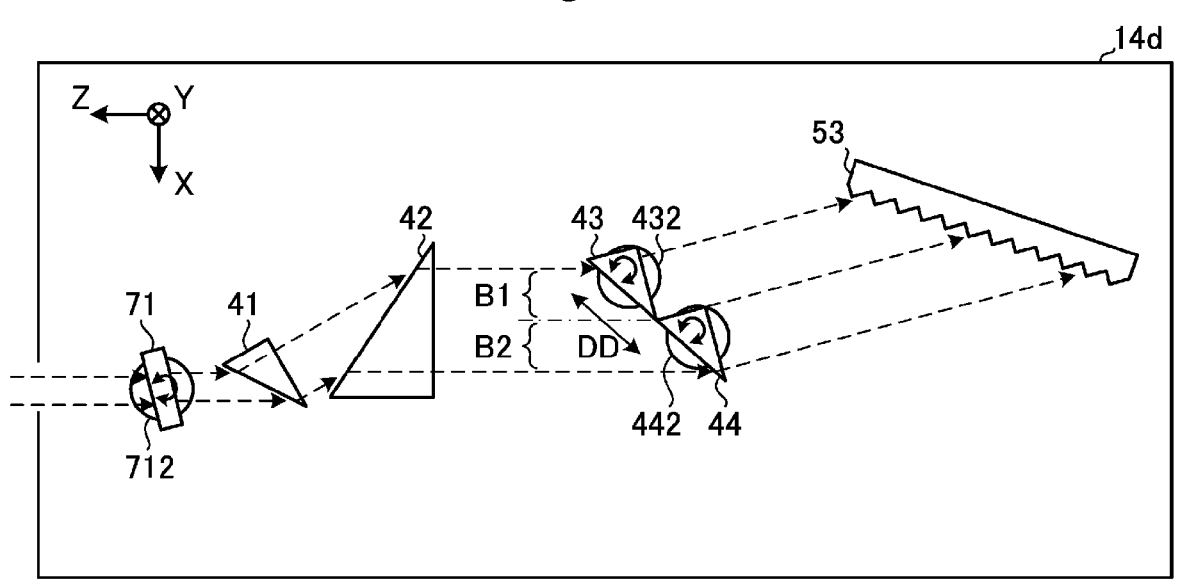
FIG. 33 schematically illustrates the configuration of a line narrowing device in a fourth embodiment.
Figure 34:
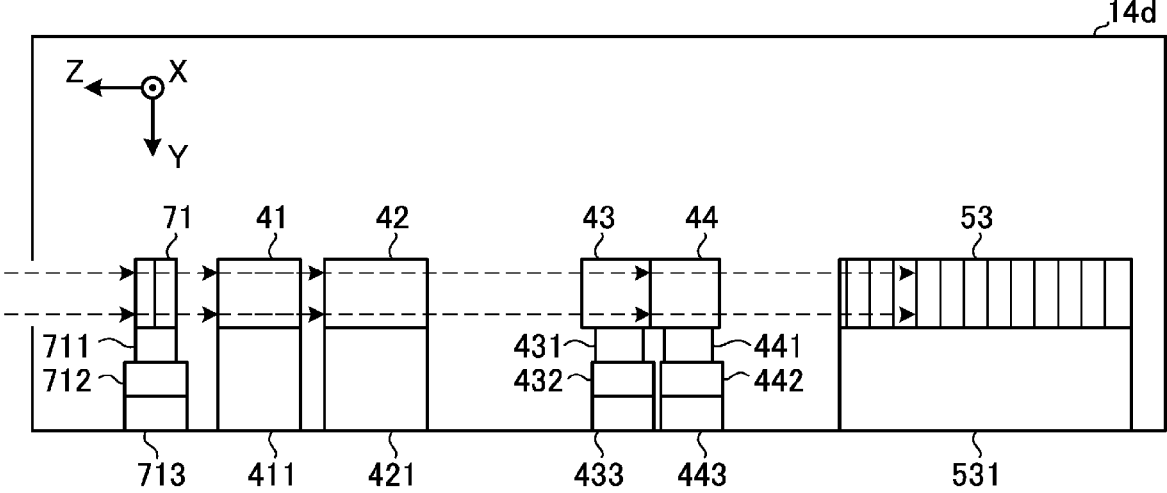
FIG. 34 schematically illustrates the configuration of the line narrowing device in the fourth embodiment.

FIGS. 33 and 34 schematically illustrate the configuration of a line narrowing device 14*d* in a fourth embodiment. FIG. 33 illustrates the line narrowing device 14*d* viewed in the positive Y direction, and FIG. 34 illustrates the line narrowing device 14*d* viewed in the negative X direction. The line narrowing device 14*d* includes prisms 43 and 44, a grating 53, and a parallel plane substrate 71 in place of the grating system 50*a* and the beam separation optical system 60*a* in the first embodiment.

The prisms 43 and 44 are disposed at positions different from each other in a wavelength dispersion direction DD of any of the prisms 43 and 44 on the optical path of the optical beam having passed through the prism 42. The prism 43 is supported by a holder 431, and the prism 44 is supported by a holder 441. The positions of the prisms 43 and 44 are set such that the optical beam having passed through the prism 42 is incident across the prisms 43 and 44. The wavelength dispersion direction DD of a prism is a direction in which the refraction angle of light at the surface of the prism disperses in accordance with the wavelength. In the example illustrated in FIGS. 33 and 34, the wavelength dispersion directions DD of the prisms 43 and 44 are identical.

The prisms 43 and 44 are disposed such that surfaces of the prisms 43 and 44 that the optical beam is incident on and output from are all parallel to the Y axis.

The prism 43 is rotatable about an axis parallel to the Y axis by a third rotation stage 432, and the prism 44 is rotatable about an axis parallel to the Y axis by a fourth rotation stage 442.

An encoder 433 is attached to the third rotation stage 432 of the prism 43. An encoder 443 is attached to the fourth rotation stage 442 of the prism 44.

In the fourth embodiment, the prism 43 corresponds to the first optical element in the present disclosure, and the prism 44 corresponds to the second optical element in the present disclosure. The third rotation stage 432 corresponds to the first actuator in the present disclosure, and the fourth rotation stage 442 corresponds to the second actuator in the present disclosure. The encoder 433 corresponds to the first encoder in the present disclosure, and the encoder 443 corresponds to the second encoder in the present disclosure.

The grating 53 is disposed across the optical paths of the first part B1 of the optical beam having passed through the prism 43 and the second part B2 of the optical beam having passed through the prism 44. The direction of grooves of the grating 53 matches the direction of the Y axis. The grating 53 is supported by a holder 531.

The parallel plane substrate 71 is disposed on the optical path of the optical beam output through the window 10a. For example, the parallel plane substrate 71 is disposed on the optical path of the optical beam between the window 10a and the prism 41. The parallel plane substrate 71 is supported by a holder 711. The parallel plane substrate 71 is disposed such that surfaces of the parallel plane substrate 71 that the optical beam is incident on and output from are both parallel to the Y axis. The parallel plane substrate 71 is rotatable about an axis parallel to the Y axis by a fifth rotation stage 712. An encoder 713 is attached to the fifth rotation stage 712 of the parallel plane substrate 71.

The fifth rotation stage 712 in the fourth embodiment corresponds to the third actuator in the present disclosure. The encoder 713 corresponds to the third encoder in the present disclosure.

5.2 Operation

The parallel plane substrate 71 transmits the optical beam with refraction at the same angle in directions opposite to each other at a surface on which the optical beam output through the window 10a is incident and a surface from which the optical beam is output toward the prism 41. Thus, the optical beam output from the parallel plane substrate 71 has the same traveling direction as the optical beam incident on the parallel plane substrate 71 and has an optical path axis shifted from that of the incident optical beam in the direction of the X axis in accordance with the posture of the parallel plane substrate 71. The optical path axis is the central axis of the optical path.

The optical beam having transmitted through the parallel plane substrate 71 is incident on the prism 41 and thereafter incident on the prism 42. The prisms 41 and 42 transmit the optical beam while expanding the beam width of the optical beam in a plane parallel to the XZ plane.

The first part B1 of the optical beam having passed through the prism 42 is incident on the prism 43, and the second part B2 thereof is incident on the prism 44. The incident angles of the optical beams incident on the prisms 43 and 44 depend on the postures of the respective prisms 43 and 44. The traveling directions of the optical beams incident on the prisms 43 and 44 are changed in accordance with the postures of the respective prisms 43 and 44, and then the optical beams are output toward the grating 53.

The light incident on the grating 53 from the prisms 43 and 44 is reflected by the grooves of the grating 53 and diffracted in a direction in accordance with the wavelength of the light. Accordingly, the light reflected by the grooves of the grating 53 is dispersed in a plane parallel to the XZ plane. The prism 43 is disposed in such a posture that the incident angle of the first part B1 of the optical beam incident on the grating 53 from the prism 43 matches the diffracting angle of light of the wavelength λ1 in the light diffracted by the grating 53. The prism 44 is disposed in such a posture that the incident angle of the second part B2 of the optical beam incident on the grating 53 from the prism 44 matches the diffracting angle of light of the wavelength λ2 in the light diffracted by the grating 53. When the incident angles of the optical beams incident on the grating 53 from the prisms 43 and 44 are different from each other, a wavelength difference occurs between the wavelength λ1 of the diffracted light returned from the grating 53 to the prism 43 and the wavelength λ2 of the diffracted light returned from the grating 53 to the prism 44.

Although only optical beams in a direction from the prism 41 to the grating 53 are illustrated with dashed line arrows in FIGS. 33 and 34, an optical beam of a wavelength selected by the line narrowing device 14d travels from the grating 53 toward the prism 41 through paths opposite to the dashed line arrows.

The prisms 41 to 44 reduce the beam width of light returned from the grating 53 in a plane parallel to the XZ plane and return the light into the laser chamber 10 through the window 10a.

The third rotation stage 432 and the fourth rotation stage 442 are controlled by the laser control processor 130.

When the third rotation stage 432 slightly rotates the prism 43, the traveling direction of the first part B1 of the optical beam output from the prism 43 toward the grating 53 slightly changes in a plane parallel to the XZ plane. Accordingly, the incident angle of the first part B1 of the optical beam incident on the grating 53 from the prism 43 slightly changes. As a result, the wavelength λ1 changes.

When the fourth rotation stage 442 slightly rotates the prism 44, the traveling direction of the second part B2 of the optical beam output from the prism 44 toward the grating 53 slightly changes in a plane parallel to the XZ plane. Accordingly, the incident angle of the second part B2 of the optical beam incident on the grating 53 from the prism 44 slightly changes. As a result, the wavelength λ2 changes.

With the above-described configuration and operation, light of the wavelength λ1 and light of the wavelength λ2 in an optical beam output through the window 10a of the laser chamber 10 are selected and returned into the laser chamber 10. Accordingly, the laser apparatus 100 can perform two-wavelength oscillation. The wavelengths λ1 and λ2 can be separately set by controlling the third rotation stage 432 and the fourth rotation stage 442.

As the fifth rotation stage 712 changes the posture of the parallel plane substrate 71, the shift amount of an optical beam in the direction of the X axis when the optical beam passes through the parallel plane substrate 71 changes and the positions of optical beams incident on the prisms 41 to 44 change in the direction of the X axis. Accordingly, the proportion between the first part B1 and the second part B2 changes. For example, the proportion of the first part B1 decreases as the parallel plane substrate 71 is rotated clockwise in FIG. 33, and the proportion of the first part B1 increases as the parallel plane substrate is rotated anticlockwise. Accordingly, the intensity ratio R between the wavelength component of the wavelength λ1 and the wavelength component of the wavelength λ2 included in a pulse laser beam can be adjusted.

The laser control processor 130 controls the third rotation stage 432 based on the target wavelength λ1t received from the exposure control processor 210. Accordingly, the third rotation stage 432 changes the posture of the prism 43.

The laser control processor 130 controls the fourth rotation stage 442 based on the target wavelength λ2t received from the exposure control processor 210. Accordingly, the fourth rotation stage 442 changes the posture of the prism 44.

The laser control processor 130 controls the fifth rotation stage 712 based on the target intensity ratio Rt received from the exposure control processor 210. Accordingly, the fifth rotation stage 712 adjusts the posture of the parallel plane substrate 71.

The other features of the fourth embodiment are the same as those of any one of the first to third embodiments. However, in the flowcharts of the first to third embodiments, a constituent component of the first embodiment may be replaced with a corresponding constituent component of the fourth embodiment. For example, the first rotation stage 512, the second rotation stage 522, and the linear stage 612 in the first embodiment may be replaced with the third rotation stage 432, the fourth rotation stage 442, and the fifth rotation stage 712 in the fourth embodiment.

5.3 First Modification

Figure 35:
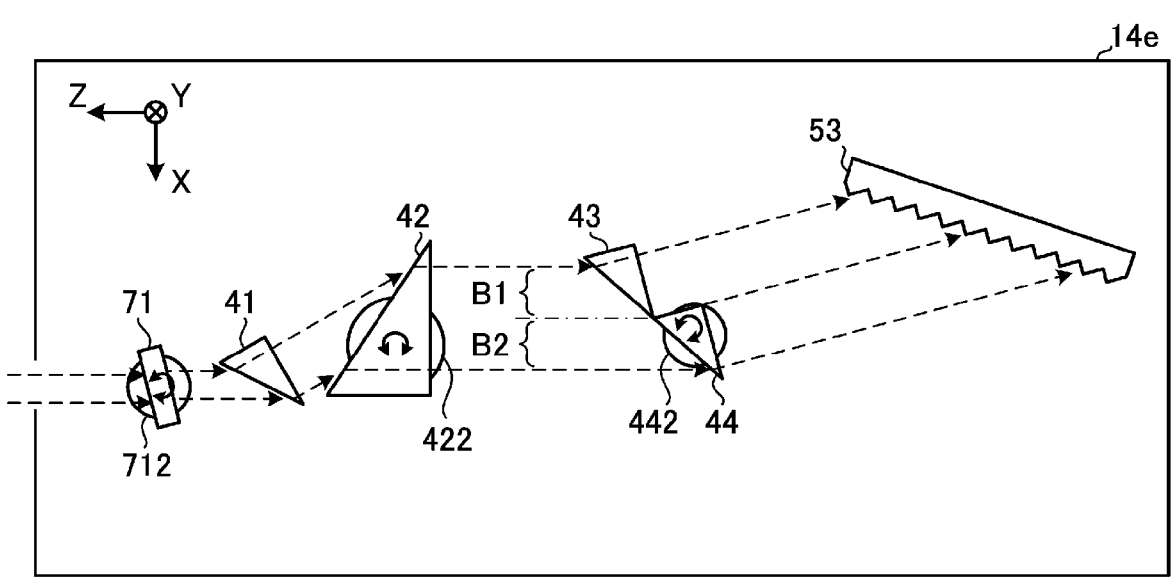
FIG. 35 schematically illustrates the configuration of a line narrowing device in a first modification of the fourth embodiment.
Figure 36:
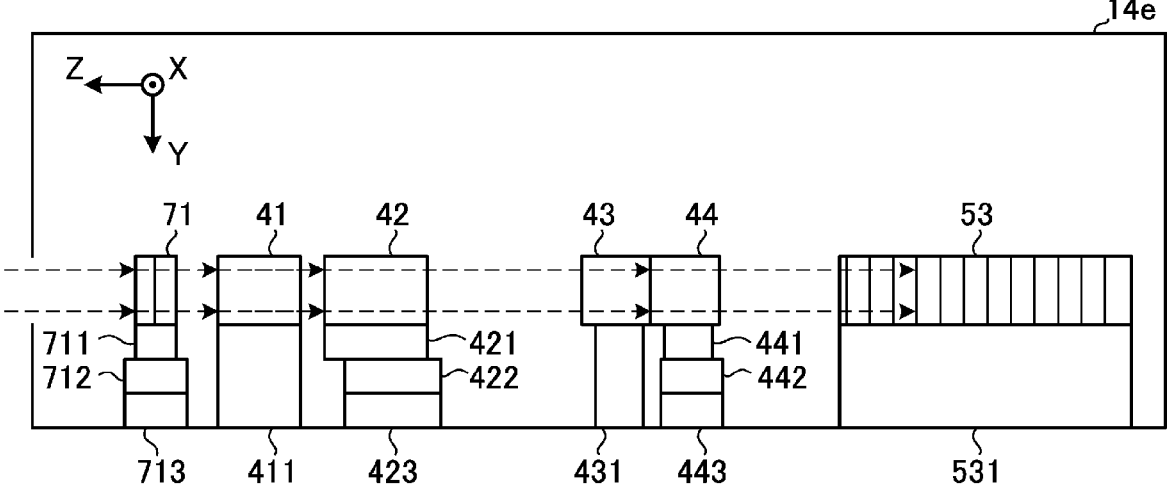
FIG. 36 schematically illustrates the configuration of the line narrowing device in the first modification of the fourth embodiment.

FIGS. 35 and 36 schematically illustrate the configuration of a line narrowing device 14e in a first modification of the fourth embodiment. FIG. 35 illustrates the line narrowing device 14e viewed in the positive Y direction, and FIG. 36 illustrates the line narrowing device 14e viewed in the negative X direction.

In the line narrowing device 14e, the prism 42 is rotatable about an axis parallel to the Y axis by a sixth rotation stage 422. An encoder 423 is attached to the sixth rotation stage 422 of the prism 42.

The prism 42 in the first modification corresponds to the first optical element in the present disclosure. The sixth rotation stage 422 corresponds to the first actuator in the present disclosure. The encoder 423 corresponds to the first encoder in the present disclosure.

In the line narrowing device 14e, the prism 43 is supported by the holder 431 such that the prism 43 maintains a constant posture.

In the first modification, the sixth rotation stage 422 rotates the prism 42. Accordingly, the incident angle of an optical beam incident on the grating 53 from the prism 42 through the prisms 43 and 44 changes. Thus, the wavelengths λ1 and λ2 both change. Moreover, the wavelength λ2 can be changed independently from the wavelength λ1 by rotating the prism 44 by using the fourth rotation stage 442, thereby changing the wavelength difference between the wavelengths λ1 and λ2. Thus, the wavelengths λ1 and λ2 can be made close to the target wavelengths λ1t and λ2t, respectively, by controlling both the sixth rotation stage 422 and the fourth rotation stage 442.

As the prism 42 is rotated, positions at which optical beams are incident on the prisms 43 and 44 from the prism 42 change. Accordingly, as the prism 42 is rotated, the proportion between the first part B1 and the second part B2 changes and the intensity ratio R between the wavelengths λ1 and λ2 changes. When the intensity ratio R between the wavelengths λ1 and λ2 becomes out of the allowable range as the prism 42 is rotated, the intensity ratio R of the wavelengths λ1 and λ2 may be adjusted by controlling the posture of the parallel plane substrate 71.

The other features of the first modification are the same as those of the fourth embodiment described above with reference to FIGS. 33 and 34. However, in each flowchart, the third rotation stage 432 of the fourth embodiment may be replaced with the sixth rotation stage 422 of the first modification.

5.4 Second Modification

Figure 37:
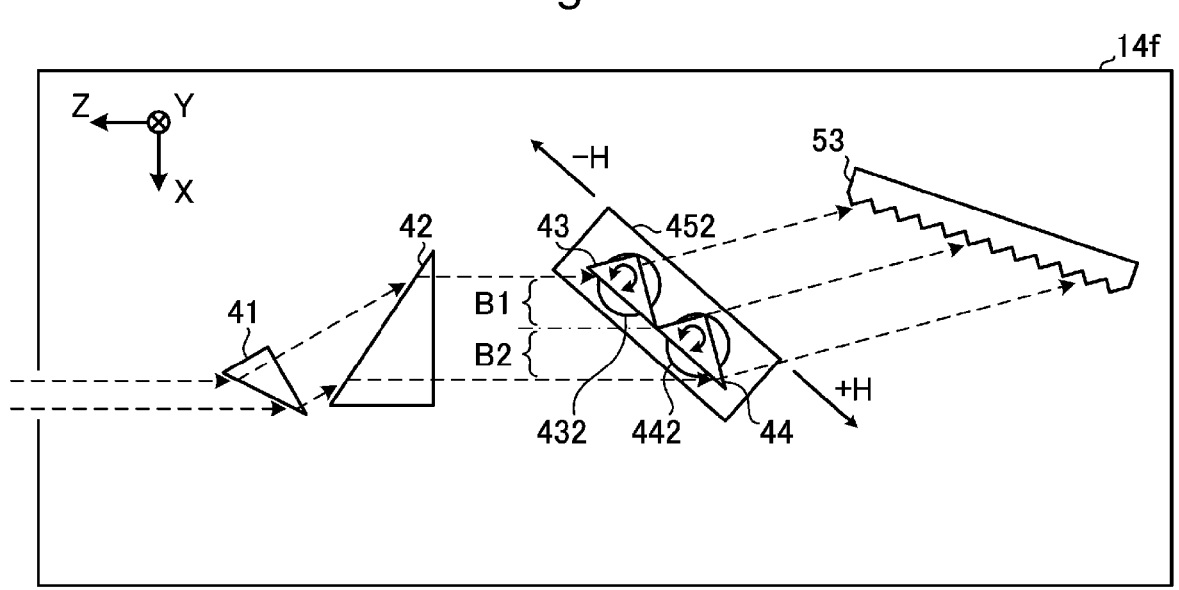
FIG. 37 schematically illustrates the configuration of a line narrowing device in a second modification of the fourth embodiment.
Figure 38:
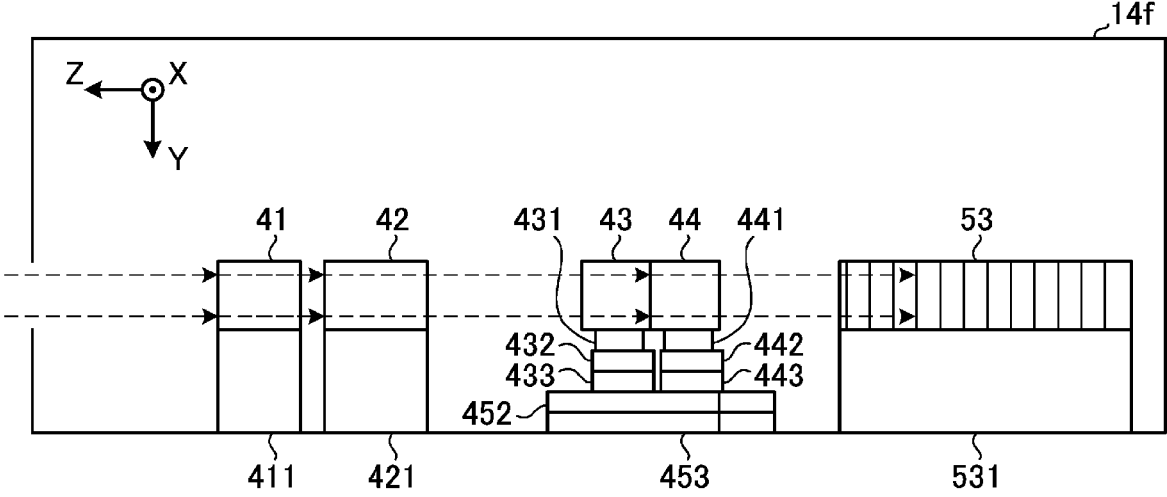
FIG. 38 schematically illustrates the configuration of the line narrowing device in the second modification of the fourth embodiment.

FIGS. 37 and 38 schematically illustrate the configuration of a line narrowing device 14f in a second modification of the fourth embodiment. FIG. 37 illustrates the line narrowing device 14f viewed in the positive Y direction, and FIG. 38 illustrates the line narrowing device 14f viewed in the negative X direction.

The line narrowing device 14f includes a linear stage 452. An encoder 453 is attached to the linear stage 452.

The linear stage 452 moves the prisms 43 and 44 integrally with the holders 431 and 441, the third and fourth rotation stages 432 and 442, and the encoders 433 and 443, respectively. A direction in which the prisms 43 and 44 are moved by the linear stage 452 is a direction intersecting the YZ plane. The direction intersecting the YZ plane is a direction intersecting a plane parallel to both the optical path axis of optical beams incident on the prisms 43 and 44 from the prism 42 and the grooves of the grating 53 and is, for example, the wavelength dispersion direction DD (refer to FIG. 33) of any of the prisms 43 and 44.

In the second modification, the linear stage 452 corresponds to the third actuator in the present disclosure. The encoder 453 corresponds to the third encoder in the present disclosure. In the second modification, the parallel plane substrate 71 (refer to FIGS. 33 and 34) may be omitted.

As the linear stage 452 moves the prisms 43 and 44, the proportion between the first part B1 incident on the prism 43 and the second part B2 incident on the prism 44 in the optical beam output from the prism 42 changes. For example, the proportion of the first part B1 decreases as the prisms 43 and 44 are moved in the negative H direction, and the proportion of the first part B1 increases as the prisms 43 and 44 are moved in the positive H direction.

The other features of the second modification are the same as those of the fourth embodiment described above with reference to FIGS. 33 and 34. However, the fifth rotation stage 712 of the fourth embodiment may be replaced with the linear stage 452 of the second modification.

6. OTHER

The description above is intended to be illustrative and the present disclosure is not limited thereto. Therefore, it would be obvious to those skilled in the art that various modifications to the embodiments of the present disclosure would be possible without departing from the scope of the appended claims. Further, it would be also obvious for those skilled in the art that embodiments of the present disclosure would be appropriately combined and used.

The terms used throughout the present specification and the appended claims should be interpreted as "non-limiting" terms unless otherwise stated. For example, the terms "include" and "be included" should be interpreted as "including the stated elements but not limited to the stated elements". The term "have" should be interpreted as "having the stated elements but not limited to the stated elements". Further, indefinite articles "a/an" should be interpreted to mean "at least one" or "one or more". Further, "at least one of A, B, and C" should be interpreted to mean any of "A", "B", "C", "A+B", "A+C", "B+C", and "A+B+C" as well as to include combinations of any thereof and any other than "A", "B", and "C".

What is claimed is:

1. A laser apparatus comprising:
    a first optical element and a second optical element;
    a first actuator configured to change a first wavelength component included in a pulse laser beam by changing a posture of the first optical element;
    a second actuator configured to change a second wavelength component included in the pulse laser beam by changing a posture of the second optical element;

33 a first encoder configured to measure a position of the first actuator;

a second encoder configured to measure a position of the second actuator;

an optical meter configured to measure the first wavelength component and the second wavelength component;

a third actuator configured to change an intensity ratio between the first wavelength component and the second wavelength component; and a processor configured to measure the first wavelength component by using the optical meter in a state in which a proportion of the first wavelength component is set to be larger than a proportion of the second wavelength component by the third actuator, store, in a storage device, a relation between the position of the first actuator measured by the first encoder and the first wavelength component, as a first relation, measure the second wavelength component by using the optical meter in a state in which the proportion of the second wavelength component is set to be larger than the proportion of the first wavelength component by the third actuator, store, in the storage device, a relation between the position of the second actuator measured by the second encoder and the second wavelength component, as a second relation, read the first relation and the second relation, and perform control of the first actuator based on the first relation and the position of the first actuator measured by the first encoder and control of the second actuator based on the second relation and the position of the second actuator measured by the second encoder.

2. The laser apparatus according to claim 1, further comprising:

a third encoder configured to measure a position of the third actuator, wherein the processor is configured to read a third relation between the position of the third actuator and the intensity ratio, and perform control of the third actuator based on the third relation and the position of the third actuator measured by the third encoder.

3. The laser apparatus according to claim 2, wherein the optical meter further measures the intensity ratio between the first wavelength component and the second wavelength component, and the processor is configured to measure the intensity ratio by using the optical meter and store, in the storage device, a relation between the position of the third actuator measured by the third encoder and the intensity ratio, as the third relation.

4. The laser apparatus according to claim 3, wherein the processor is configured to perform control of the first actuator and the second actuator so that a wavelength difference between the first wavelength component and the second wavelength component approaches half of a free-spectral range of the optical meter, and then measure the intensity ratio by using the optical meter.

5. The laser apparatus according to claim 2, wherein the third relation is stored in the storage device in association with a repetition frequency of the pulse laser beam, and the processor is configured to perform control of the third actuator based on the third relation associated with the repetition frequency of the pulse laser beam and based on the position of the third actuator measured by the third encoder.

6. The laser apparatus according to claim 2, further comprising:

a laser chamber;

a pair of electrodes disposed in the laser chamber; and a charger configured to store electric energy for applying voltage to the electrodes, wherein the third relation is stored in the storage device in association with charging voltage of the charger, and the processor is configured to perform control of the third actuator based on the third relation associated with the charging voltage of the charger and based on the position of the third actuator measured by the third encoder.

7. The laser apparatus according to claim 1, wherein the optical meter further measures the intensity ratio between the first wavelength component and the second wavelength component, and the processor is configured to read a target intensity ratio, perform control of the third actuator so that the intensity ratio measured by using the optical meter approaches the target intensity ratio, and then perform control of the first actuator based on the first relation and the position of the first actuator measured by the first encoder and control of the second actuator based on the second relation and the position of the second actuator measured by the second encoder.

8. The laser apparatus according to claim 7, wherein the processor is configured to perform control of the first actuator and the second actuator so that a wavelength difference between the first wavelength component and the second wavelength component approaches half of a free-spectral range of the optical meter, and then perform control of the third actuator so that the intensity ratio measured by using the optical meter approaches the target intensity ratio.

9. A wavelength control method for a laser apparatus including a first optical element and a second optical element, a first actuator configured to change a first wavelength component included in a pulse laser beam by changing a posture of the first optical element, a second actuator configured to change a second wavelength component included in the pulse laser beam by changing a posture of the second optical element, a first encoder configured to measure a position of the first actuator, a second encoder configured to measure a position of the second actuator, an optical meter configured to measure the first wavelength component and the second wavelength component, a third actuator configured to change an intensity ratio between the first wavelength component and the second wavelength component, and a processor, the wavelength control method comprising:

measuring, by the processor, the first wavelength component by using the optical meter in a state in which a proportion of the first wavelength component is set to be larger than a proportion of the second wavelength component by the third actuator;

storing, in a storage device, a relation between the position of the first actuator measured by the first encoder and the first wavelength component, as a first relation;

measuring, by the processor, the second wavelength component by using the optical meter in a state in which the proportion of the second wavelength component is set to be larger than the proportion of the first wavelength component by the third actuator;

storing, in the storage device, a relation between the position of the second actuator measured by the second encoder and the second wavelength component, as a second relation;

reading, by the processor, the first relation and the second relation; and performing, by the processor, control of the first actuator based on the first relation and the position of the first actuator measured by the first encoder and control of the second actuator based on the second relation and the position of the second actuator measured by the second encoder.

10. The wavelength control method according to claim 9, wherein the laser apparatus further includes a third encoder configured to measure a position of the third actuator, and the wavelength control method further comprises:

reading, by the processor, a third relation between the position of the third actuator and the intensity ratio; and performing, by the processor, control of the third actuator based on the third relation and the position of the third actuator measured by the third encoder.

11. The wavelength control method according to claim 10, wherein the optical meter further measures the intensity ratio between the first wavelength component and the second wavelength component, and the wavelength control method further comprises measuring, by the processor, the intensity ratio by using the optical meter and storing, by the processor, in the storage device, a relation between the position of the third actuator measured by the third encoder and the intensity ratio, as the third relation.

12. The wavelength control method according to claim 11, further comprising:

performing, by the processor, control of the first actuator and the second actuator so that a wavelength difference between the first wavelength component and the second wavelength component approaches half of a free-spectral range of the optical meter; and then measuring, by the processor, the intensity ratio by using the optical meter.

13. The wavelength control method according to claim 10, wherein the third relation is stored in the storage device in association with a repetition frequency of the pulse laser beam, and the wavelength control method further comprises performing, by the processor, control of the third actuator based on the third relation associated with the repetition frequency of the pulse laser beam and based on the position of the third actuator measured by the third encoder.

14. The wavelength control method according to claim 10, wherein the laser apparatus further includes a laser chamber, a pair of electrodes disposed in the laser chamber, and a charger configured to store electric energy for applying voltage to the electrodes, the third relation is stored in the storage device in association with charging voltage of the charger, and the wavelength control method further comprises performing, by the processor, control of the third actuator based on the third relation associated with the charging voltage of the charger and based on the position of the third actuator measured by the third encoder.

15. The wavelength control method according to claim 9, wherein the optical meter further measures the intensity ratio between the first wavelength component and the second wavelength component, and the wavelength control method further comprises:

reading, by the processor, a target intensity ratio;

performing, by the processor, control of the third actuator so that the intensity ratio measured by using the optical meter approaches the target intensity ratio; and then performing, by the processor, control of the first actuator based on the first relation and the position of the first actuator measured by the first encoder and control of the second actuator based on the second relation and the position of the second actuator measured by the second encoder.

16. An electronic device manufacturing method comprising:

generating a pulse laser beam with a laser apparatus, the laser apparatus including a first optical element and a second optical element, a first actuator configured to change a first wavelength component included in the pulse laser beam by changing a posture of the first optical element, a second actuator configured to change a second wavelength component included in the pulse laser beam by changing a posture of the second optical element, a first encoder configured to measure a position of the first actuator, a second encoder configured to measure a position of the second actuator, an optical meter configured to measure the first wavelength component and the second wavelength component, a third actuator configured to change an intensity ratio between the first wavelength component and the second wavelength component, and a processor configured to measure the first wavelength component by using the optical meter in a state in which a proportion of the first wavelength component is set to be larger than a proportion of the second wavelength component by the third actuator, store, in a storage device, a relation between the position of the first actuator measured by the first encoder and the first wavelength component, as a first relation, measure the second wavelength component by using the optical meter in a state in which the proportion of the second wavelength component is set to be larger than the proportion of the first wavelength component by the third actuator, store, in the storage device, a relation between the position of the second actuator measured by the second encoder and the second wavelength component, as a second relation, read the first relation and the second relation, and perform control of the first actuator based on the first relation and the position of the first actuator measured by the first encoder and control of the second actuator based on the second relation and the position of the second actuator measured by the second encoder;

outputting the pulse laser beam to an exposure apparatus; and exposing a photosensitive substrate to the pulse laser beam in the exposure apparatus to manufacture an electronic device.

\* \* \* \* \*